United States Patent
Gundlapalli et al.

(10) Patent No.: US 6,821,470 B2
(45) Date of Patent: Nov. 23, 2004

(54) JOINT PROSTHESIS MOLDING METHOD

(75) Inventors: Rama Rao V. Gundlapalli, Leesburg, IN (US); Mark Heldreth, Mentone, IN (US); Albert Burstein, Sarasota, FL (US)

(73) Assignee: Depuy Products, Inc., Warsaw, IN (US)

(*) Notice: Subject to any disclaimer, the term of this patent is extended or adjusted under 35 U.S.C. 154(b) by 81 days.

(21) Appl. No.: 10/154,732

(22) Filed: May 24, 2002

(65) Prior Publication Data

US 2003/0006530 A1 Jan. 9, 2003

Related U.S. Application Data

(60) Provisional application No. 60/302,097, filed on Jun. 30, 2001.

(51) Int. Cl.[7] .......................... B29C 45/14; B29C 70/70
(52) U.S. Cl. ................ 264/275; 264/271.1; 264/279.1; 623/901
(58) Field of Search ................ 264/259, 271.1, 264/275, 279, 279.1; 623/13.12, 20.14, 20.18, 20.19, 20.21–20.31, 901

(56) References Cited

U.S. PATENT DOCUMENTS

| | | |
|---|---|---|
| 4,298,992 A | 11/1981 | Burstein |
| 4,501,031 A | 2/1985 | McDaniel |
| 4,997,445 A | 3/1991 | Hodorek |
| 5,007,933 A | 4/1991 | Sidebotham |
| 5,139,521 A | 8/1992 | Schelhas |
| 5,176,684 A | 1/1993 | Ferrante |
| 5,282,866 A | 2/1994 | Cohen |
| 5,330,534 A * | 7/1994 | Herrington et al. ...... 623/20.27 |
| 5,358,527 A * | 10/1994 | Forte ...................... 623/20.27 |
| 5,370,699 A | 12/1994 | Hood |
| 5,405,396 A | 4/1995 | Heldreth |
| 5,413,604 A | 5/1995 | Hodge |
| 5,549,686 A | 8/1996 | Johnson |
| 5,577,368 A | 11/1996 | Hamilton |
| 5,609,643 A | 3/1997 | Colleran |
| 5,658,344 A | 8/1997 | Hurlburt |
| 5,683,470 A | 11/1997 | Johnson |
| 5,702,460 A | 12/1997 | Carls |
| 5,755,808 A | 5/1998 | DeCarlo |
| 5,776,200 A | 7/1998 | Johnson |
| 5,824,103 A | 10/1998 | Williams |
| 5,830,396 A | 11/1998 | Higgins |
| 5,871,546 A | 2/1999 | Colleran |
| 5,944,756 A * | 8/1999 | Fischetti et al. ......... 623/23.15 |
| 5,989,472 A | 11/1999 | Ashby |
| 5,997,577 A | 12/1999 | Herrington |
| 6,004,351 A * | 12/1999 | Tomita et al. ............. 623/2.21 |

(List continued on next page.)

FOREIGN PATENT DOCUMENTS

| | | |
|---|---|---|
| DE | 4434806 A1 | 4/1996 |
| EP | 0724868 A1 | 7/1996 |
| EP | 0 963 824 A2 | 12/1999 |
| EP | 1133959 A1 | 9/2001 |
| EP | 1 270 187 A3 | 2/2004 |
| FR | 2760352 | 10/1997 |

*Primary Examiner*—Angela Ortiz

(57) ABSTRACT

A method of manufacturing a bearing component for use in arthroplasty for cooperation with a first and a second component includes the step of providing a non-linear support of a durable material having. The method further includes providing a molding die for manufacturing the bearing component having first and second mold portions. The first mold portion provides a first surface for cooperation with the first joint component and the second mold portion provides a second surface for cooperation with the second joint component. The method includes positioning the support in a desired position within the molding die with the first end or the second end located in the first mold portion, adding moldable material into the molding die, surrounding the support with the moldable material, heating and pressurizing the moldable material, permitting the moldable material to cool, and removing the component from the molding die.

8 Claims, 19 Drawing Sheets

U.S. PATENT DOCUMENTS

| | | | |
|---|---|---|---|
| 6,004,352 A | 12/1999 | Buni | |
| 6,017,975 A | 1/2000 | Saum | |
| 6,039,764 A * | 3/2000 | Pottenger et al. | 623/20.32 |
| 6,123,728 A | 9/2000 | Brosnahan | |
| 6,123,729 A | 9/2000 | Insall | |
| 6,125,255 A | 9/2000 | Litman | |
| 6,126,692 A | 10/2000 | Robie | |
| 6,165,223 A * | 12/2000 | Metzger et al. | 623/20.27 |
| 6,228,900 B1 | 5/2001 | Shen | |
| 6,242,507 B1 | 6/2001 | Saum | |
| 6,413,279 B1 * | 7/2002 | Metzger et al. | 623/20.29 |
| 6,620,198 B2 * | 9/2003 | Burstein et al. | 623/20.28 |
| 6,660,039 B1 * | 12/2003 | Evans et al. | 623/20.29 |

* cited by examiner

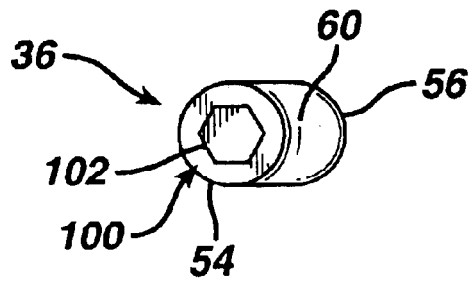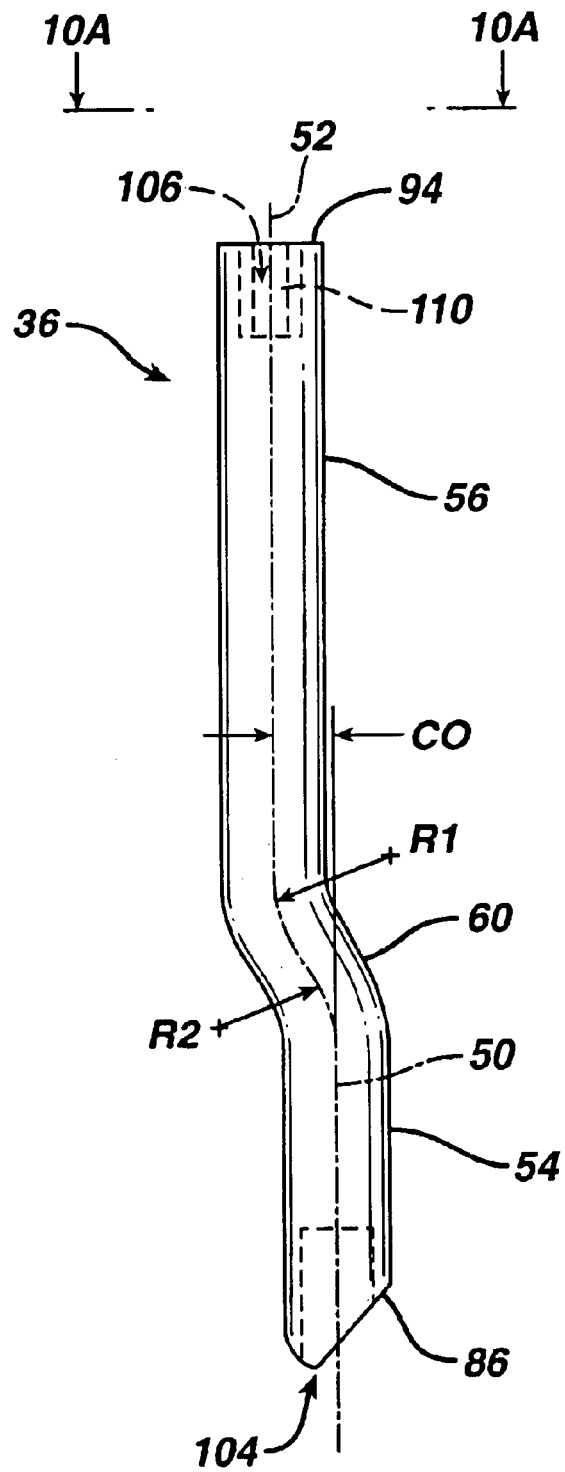

JOINT PROSTHESIS MOLDING METHOD

CROSS REFERENCE TO U.S. PROVISIONAL PATENT APPLICATION

This application is a Utility Application based upon U.S. Provisional Patent Application Ser. No. 60/302,097 filed Jun. 30, 2001, entitled JOINT PROSTHESIS MOLDING METHOD AND DIE FOR PREFORMING THE SAME.

CROSS-REFERENCE TO RELATED APPLICATIONS

Cross reference is made to the following applications: DEP-678 titled "SURFACE STERILIZABLE JOINT REPLACEMENT PROSTHESIS COMPONENT WITH INSERT" and DEP-676 titled "JOINT REPLACEMENT PROSTHESIS COMPONENT WITH NON LINEAR INSERT" filed concurrently herewith which are incorporated herein by reference.

TECHNICAL FIELD OF THE INVENTION

The present invention relates generally to the field of orthopaedics, and more particularly, to a manufacturing method and molding die for an implant for use in joint arthroplasty.

BACKGROUND OF THE INVENTION

The invention relates to joint prostheses. More particularly, the invention is directed to tibial components of knee joint prostheses that can be configured to be either rotatable or non-rotatable.

Joint replacement surgery is quite common and it enables many individuals to function normally when otherwise it would not be possible to do so. Artificial joints usually comprise metallic, ceramic and/or plastic components that are fixed to existing bone.

Knee arthroplasty is a well known surgical procedure by which a diseased and/or damaged natural knee joint is replaced with a prosthetic knee joint. A typical knee prosthesis includes a femoral component, a patella component, a tibial tray or plateau, and a tibial bearing insert. The femoral component generally includes a pair of laterally spaced apart condylar portions, the distal surfaces of which articulate with complementary condylar elements formed in a tibial bearing insert.

The tibial plateau is mounted within the tibia of a patient. Typically, the tibial bearing insert, which is usually, made of ultra high molecular weight polyethylene (UHMWPE), is mounted upon the superior surface of the tibial plateau. The geometry and structure of the tibial bearing insert varies depending upon the needs and joint condition of a patient. Some tibial bearing inserts are designed to be used with joint prostheses that are implanted during procedures that retain one or both of the cruciate ligaments. Others are implanted after removal of one or both cruciate ligaments, and are thus structured to compensate for the loss of these ligaments. Yet other tibial bearing inserts are used with prostheses that provide enhanced stabilization to the knee joint.

Recent total knee prostheses have been designed which allow for increased freedom of rotation between the femur and the tibia. To allow for this rotational motion, tibial bearing inserts have been designed which allow for rotation of the insert on the tibial tray or plateau. Typically the tibial bearing inserts have a central stem which rotationally engages centrally in the tibial stem of the tibial tray implant thereby providing for the rotational motion. Typically, there are no rotational constraints between the tibial tray implant and the tibial bearing insert. Frequently during total knee arthroplasty, the posterior cruciate ligaments are sacrificed and a substitute for the posterior cruciate ligaments is required. Orthopaedic implants for total knee arthroplasty have been developed which provide for the substitution of the posterior cruciate ligament. Examples of such implants include the PFC Sigma RP as described in U.S. Pat. No. 4,298,992 incorporated herein by reference and the LCS Complete total knee prosthesis, both of which are sold by DePuy Orthopaedics, Inc., Warsaw, Ind.

These total knee prostheses are designed with tibial components and femoral components which have in conjunction with their articulating surface, a spine and cam mechanism, which is used as a posterior cruciate substituting feature when the posterior cruciate of the knee is sacrificed.

Such total knee replacement prostheses, which include a spine and cam mechanism, typically contain tibial bearing components manufactured from suitable plastic, usually UHMWPE. One such construction use for a class of total knee replacement prosthesis which is known as constrained prosthesis often incorporate metal reinforcement rods in the construction of the plastic bearing component. The bearing insert is constructed so that the metal rod lies within the bearing and thus provides additional support for the central spine element of the bearing. Such components are typically manufactured by machining or molding the bearing component, drilling a central hole, and press fitting the reinforcing metal rod. An example of such a component is described in U.S. Pat. No. 5,007,933 to Sidebotham, et al. hereby incorporated in its entirety by reference.

In order to allow for desired kinematics of the knee during a full range of motion, the spine and cam mechanism on the tibial bearing insert may be placed in a suitable position, preferably anterior to the center line of the insert in the anterior/posterior direction. Designs of tibial inserts are available to help reconstruct knees where the stabilizing soft tissue compromises have been made or occurred due to various reasons. In such cases, the tibial bearing inserts are required to experience greater loads in the anterior/posterior and the medial/lateral directions. The constrained inserts may be reinforced with a metal rod as mentioned earlier to help distribute the loads experienced by the spine of the polyethylene tibial bearing.

Total knee joint prostheses have been designed with the spine and cam mechanisms on the tibial bearing insert placed in a position that the central axis of the distal stem portion of the insert that engages the tibial tray and the axis of the superior spine portion that engages the cam of the femoral component are not necessarily collinear.

Unfortunately, this design does not allow for a straight rod, commonly employed for reinforcement of tibial bearing inserts, to be used.

It should be appreciated that a first rod could be inserted inside the spine and a second rod could be inserted in the stem of the tibial tray portion of the bearing insert. However, the load on the first rod would be transferred through the polymer portion of the insert to the second rod. The polymer strength would then limit the load carrying capacity of this configuration. Such a configuration may not provide the required strength to sufficiently support and reinforce the spine.

A manufacturing method to produce a tibial bearing insert that may rotate about the tibial tray is thus required which has the strength required for the greater loads in the anterior/ posterior and medial/lateral direction of the spine. The present invention is directed to providing a tibial bearing insert manufacturing method and tools to perform the same with sufficient strength at the spine to withstand the loads of the mobile knee prosthesis in the anterior/posterior and medial/lateral direction.

SUMMARY OF THE INVENTION

The present invention is directed to tools and methods for making an improved joint prosthesis for total knee replacement that includes a spine and cam mechanism and a distal rotating stem. The cam mechanism being on the femoral component and the spine and distal stem being on the bearing component. The mechanism is capable of withstanding the greater loads experienced in the anterior/posterior and medial/lateral direction caused by the substitution of the cam and spine for the cruciate ligaments, which may be sacrificed during total knee arthroplasty.

The spine on the tibial bearing insert made from a method and utilizing a mold according to the present invention is placed anterior to the centerline of the insert in the anterior posterior direction. Therefore, the distal stem portion of the insert that engages the tibial tray and the superior spine portion which engages the cam of the femoral component are not in the same plane. The tibial bearing insert manufacturing method of the present invention thus includes providing a reinforcing rod placed internal to the tibial bearing insert which includes an offset feature to accommodate such plane differences.

The rotating bearing of a knee prosthesis manufacturing method of the present invention thus includes the step of providing polymeric material with reinforcing a first component including a first portion on a first center line and a second portion on a second center line such that the first portion within the polymeric material distal stem may engage the tibial tray and the second portion within the polymeric material spine may be cooperating with the cam mechanism in the femoral component of the knee prosthesis.

According to one embodiment of the present invention, there is provided a method of manufacturing a polymeric bearing component for use in joint arthroplasty. The method includes the step of providing a non-linear reinforcing support of a durable material having a first end and a second end. The method further includes the step providing a molding die adapted for manufacturing the bearing component for use in total joint arthroplasty and having a first mold portion and a second mold portion. The first mold portion is adapted to provide a first surface of the bearing component for cooperation with the first joint component and the second mold portion is adapted to provide a second surface of the bearing component for cooperation with the second joint component. The method further includes the steps of positioning the support in a desired position within the molding die with one of the first end and the second end located in the first mold portion, adding moldable polymeric material into the molding die, substantially surrounding the support with the moldable material, heating and pressurizing the mold, permitting the moldable material to cool to form the bearing component, and removing the component from the molding die.

According to another embodiment of the present invention there is provided a molding die for use to mold a moldable material over a substantial portion of a reinforcing support having first and second ends. The molding die provides an article for use in joint arthroplasty. The molding die includes a first mold portion having a first forming surface and a second mold portion having a second forming surface and being mateable with the first mold portion. The first die portion and the second mold portion form a cavity there between when the first mold portion and the second mold portion are mated, the first forming surface and the second forming surface define at least a portion of the outer periphery of the article. The molding die also includes a positioner for spacing the reinforcing support within the cavity with at least a portion of the support spaced from at least one of the first forming surface and the second forming surface. The positioner is adapted to position the first end of the reinforcing support adjacent the first forming surface and adapted to position the second end of the reinforcing support adjacent the second forming surface.

The technical advantages of the present invention include the ability to allow for the desired kinematics of the knee during a full range of motion for patients in which the cruciate ligaments have either been severely damaged or have been removed or sacrificed. In such conditions the femoral and tibial components of the knee prosthesis need to be constrained with respect to each other by use of, for example, a spine and cam mechanism.

According to another aspect of the present invention, the reinforcing support member may be placed within a molding die and a tibial bearing insert may be molded incorporating the a non-linear support member.

Other technical advantages of the present invention will be readily apparent to one skilled in the art from the following figures, descriptions and claims.

BRIEF DESCRIPTION OF THE DRAWINGS

For a more complete understanding of the present invention and the advantages thereof, reference is now made to the following description taken in connection with the accompanying drawings, in which:

FIG. 10 is a plan view of a reinforcing rod for use with the bearing component for an embodiment of the prosthesis of the present invention;

FIG. 10A is a view of the reinforcing rod of FIG. 10 along the line 10A—10A in the direction of the arrows;

DETAILED DESCRIPTION OF THE INVENTION

Embodiments of the present invention and the advantages thereof are best understood by referring to the following descriptions and drawings, wherein like numerals are used for like and corresponding parts of the drawings.

Figure 1:
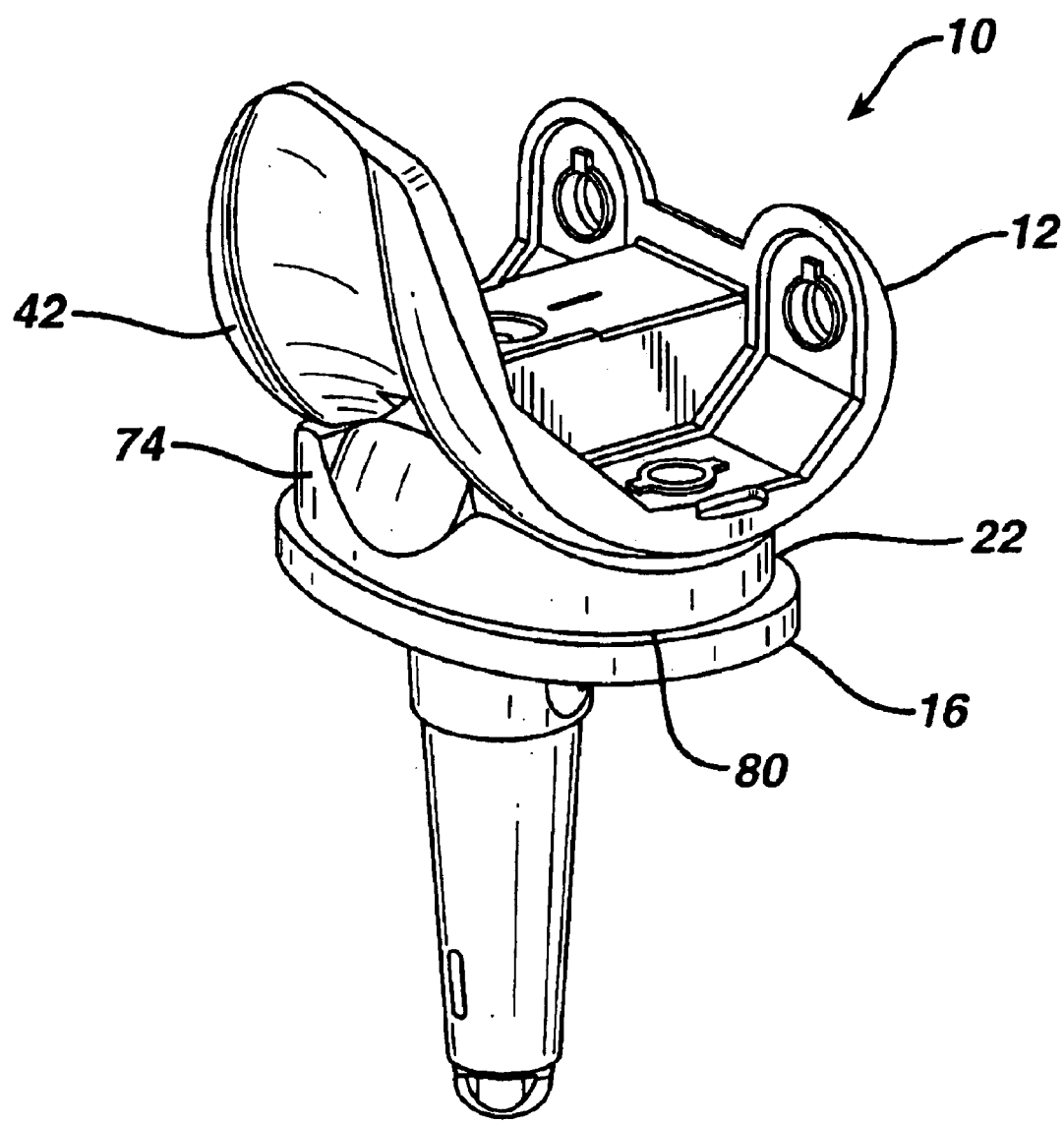
FIG. 1 is a perspective view of the knee system including the bearing component of the present invention showing the femoral component and the tibial tray component with the tibial bearing showing the knee system in extension.
Figure 2:
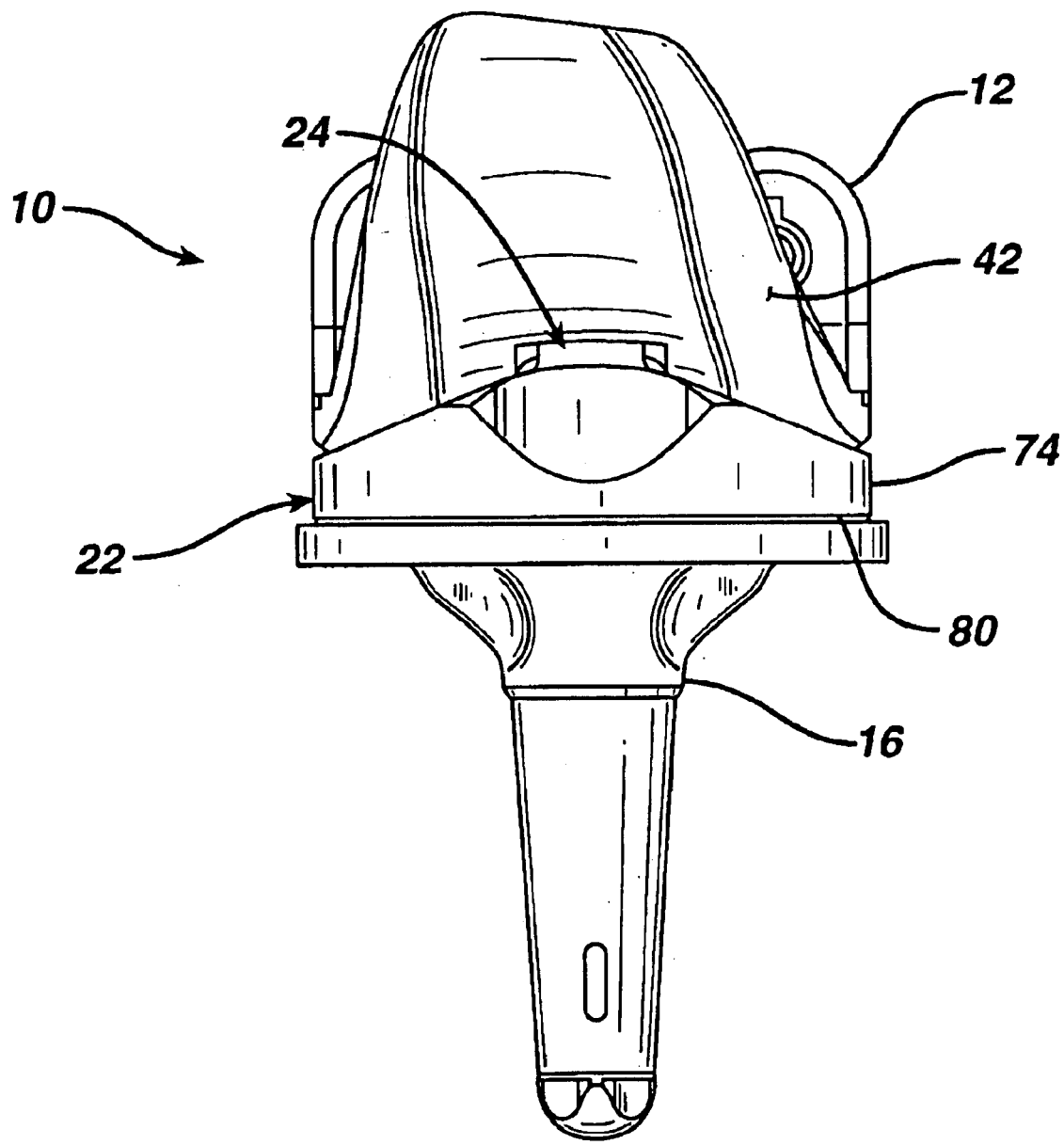
FIG. 2 is an elevation view from the anterior of FIG. 1.
Figure 3:
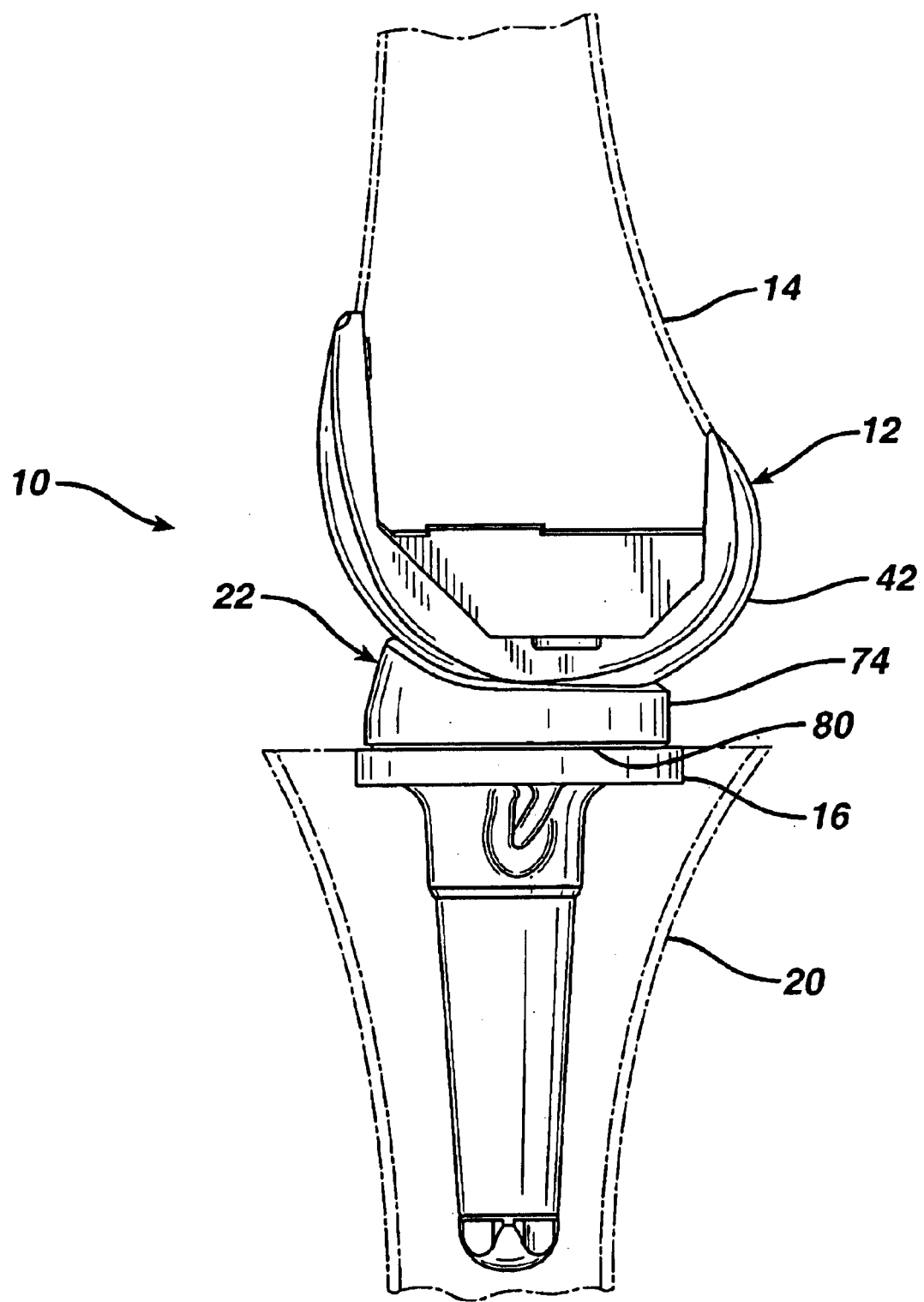
FIG. 3 is a side view of the assembly shown in FIGS. 1 and 2.
Figure 4:
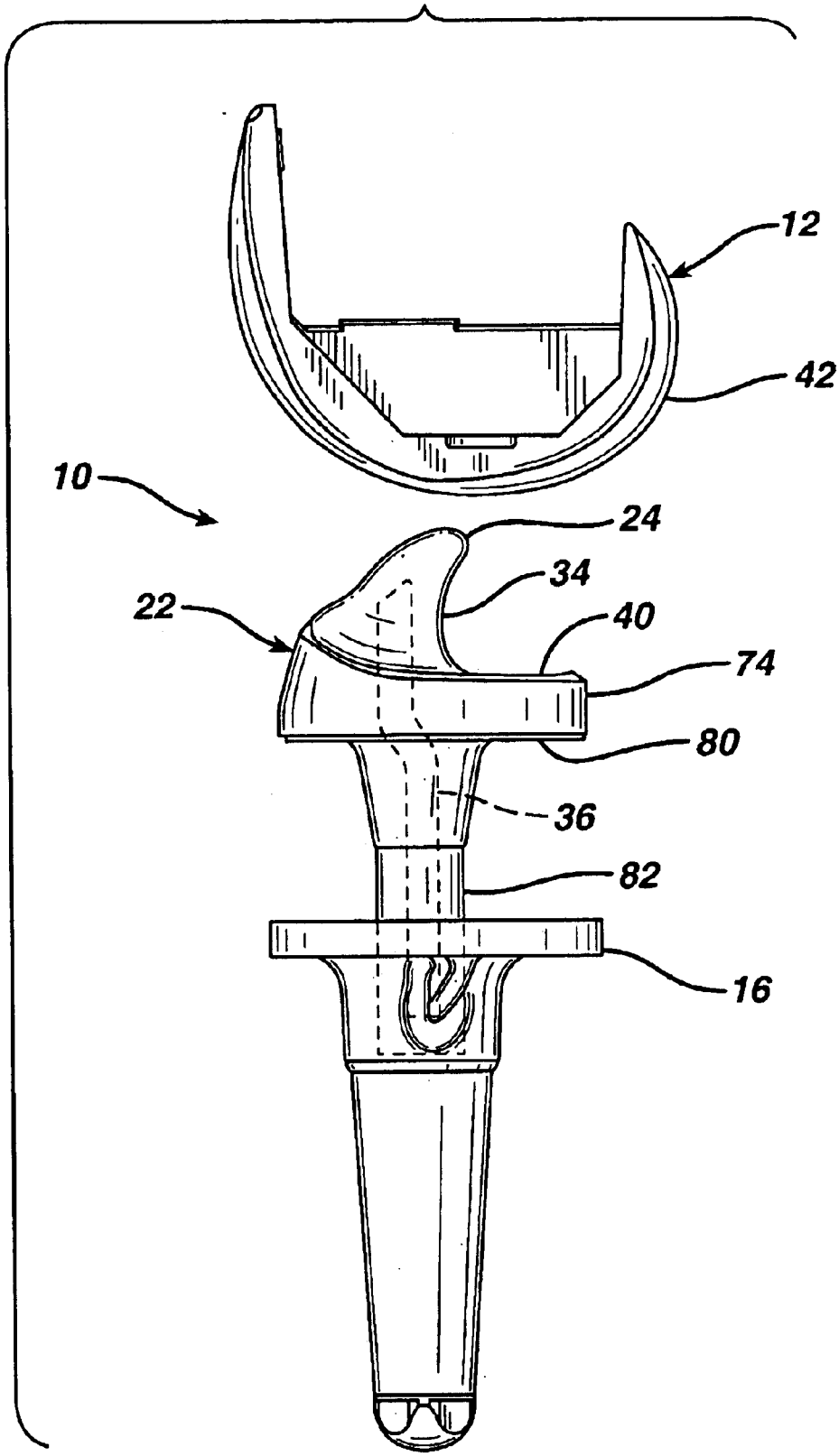
FIG. 4 is an exploded side view showing the plastic bearing component partially removed from the tibial tray or plateau.
Figure 5:
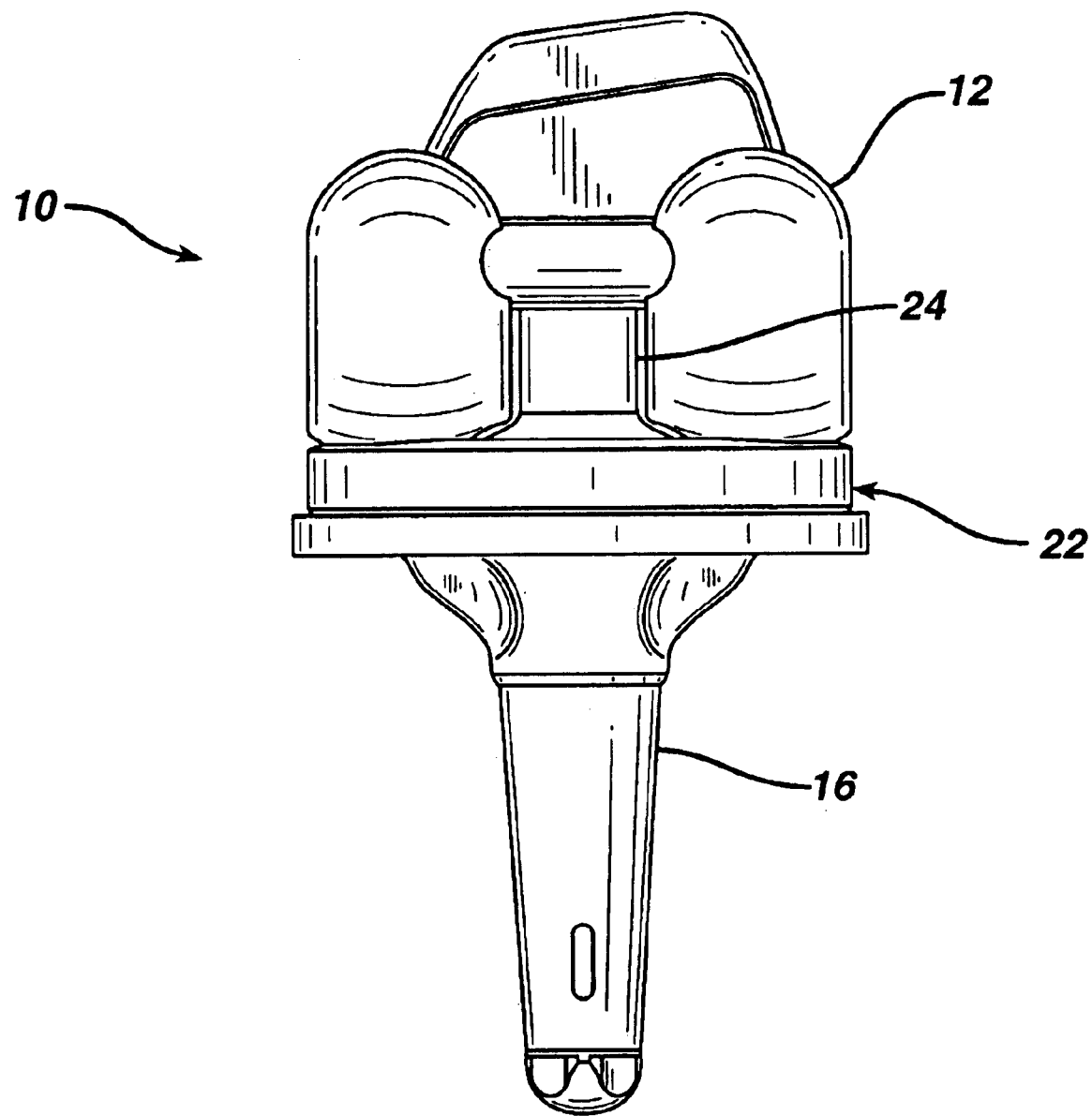
FIG. 5 is an elevation view from the posterior of FIG. 1.
Figure 6:
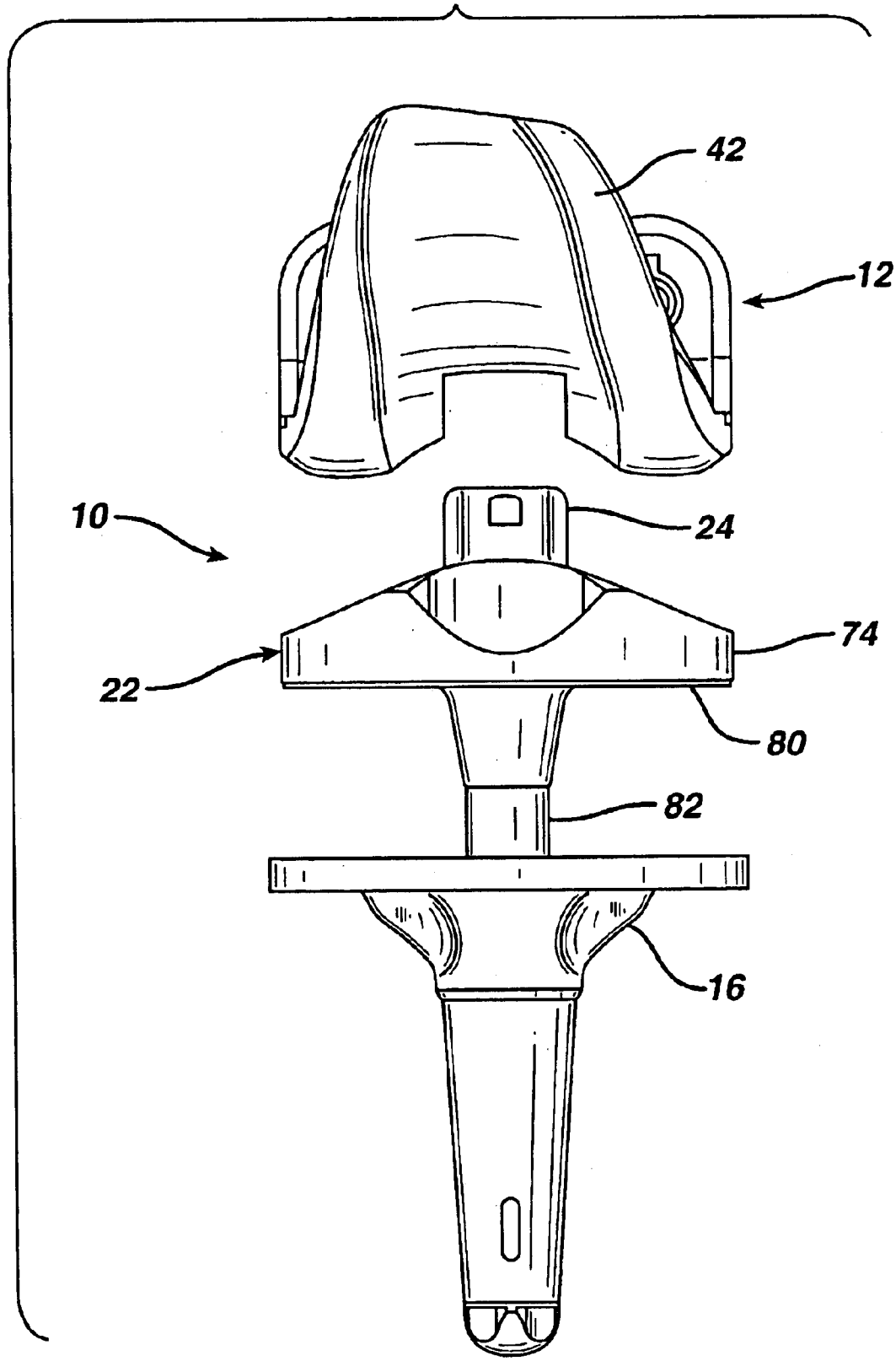
FIG. 6 is an exploded elevation view from the anterior showing the plastic bearing component partially removed from the tibial tray or plateau.
Figure 7:
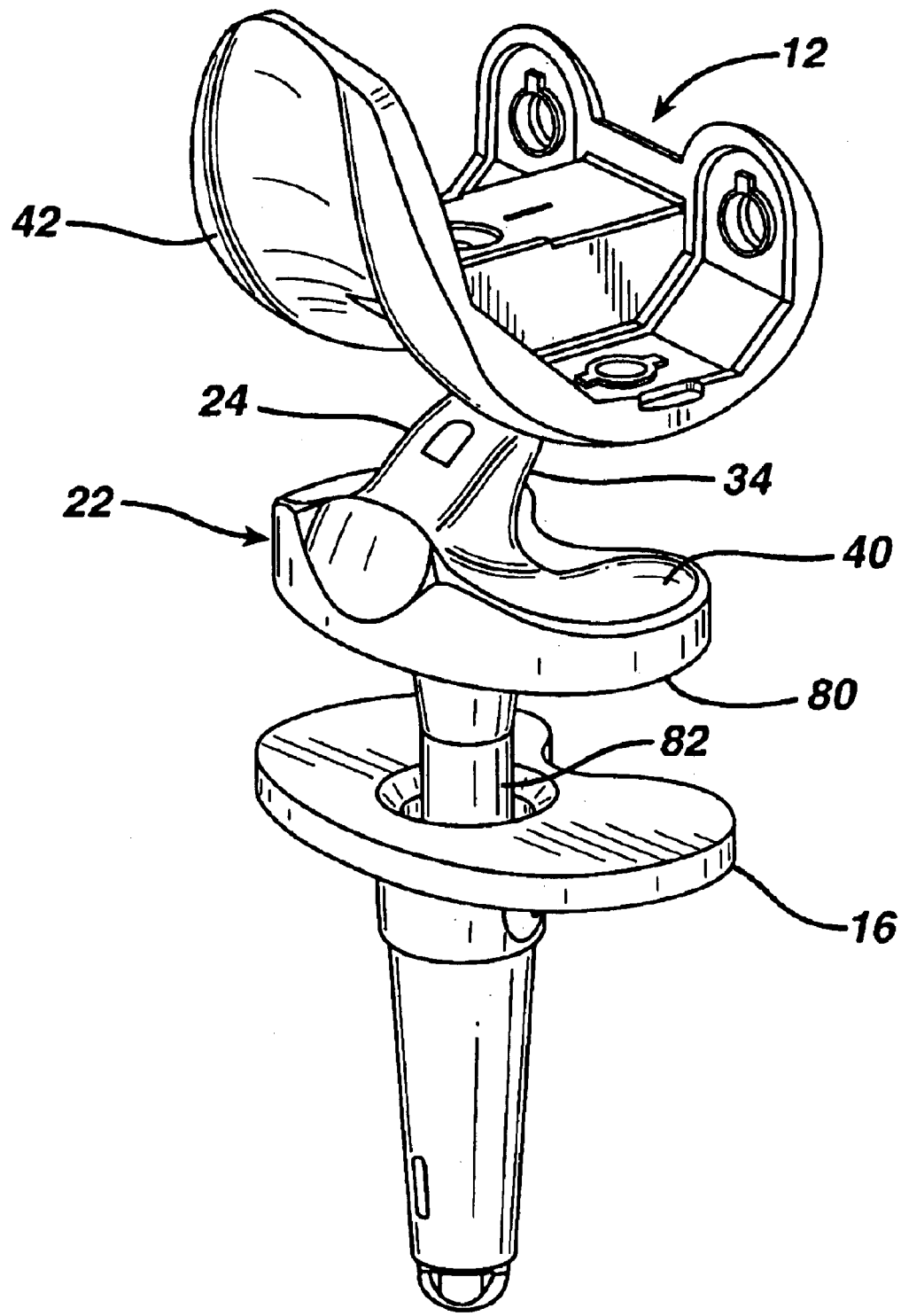
FIG. 7 is an exploded perspective view showing the plastic bearing component partially removed from the tibial tray or plateau.
Figure 8:
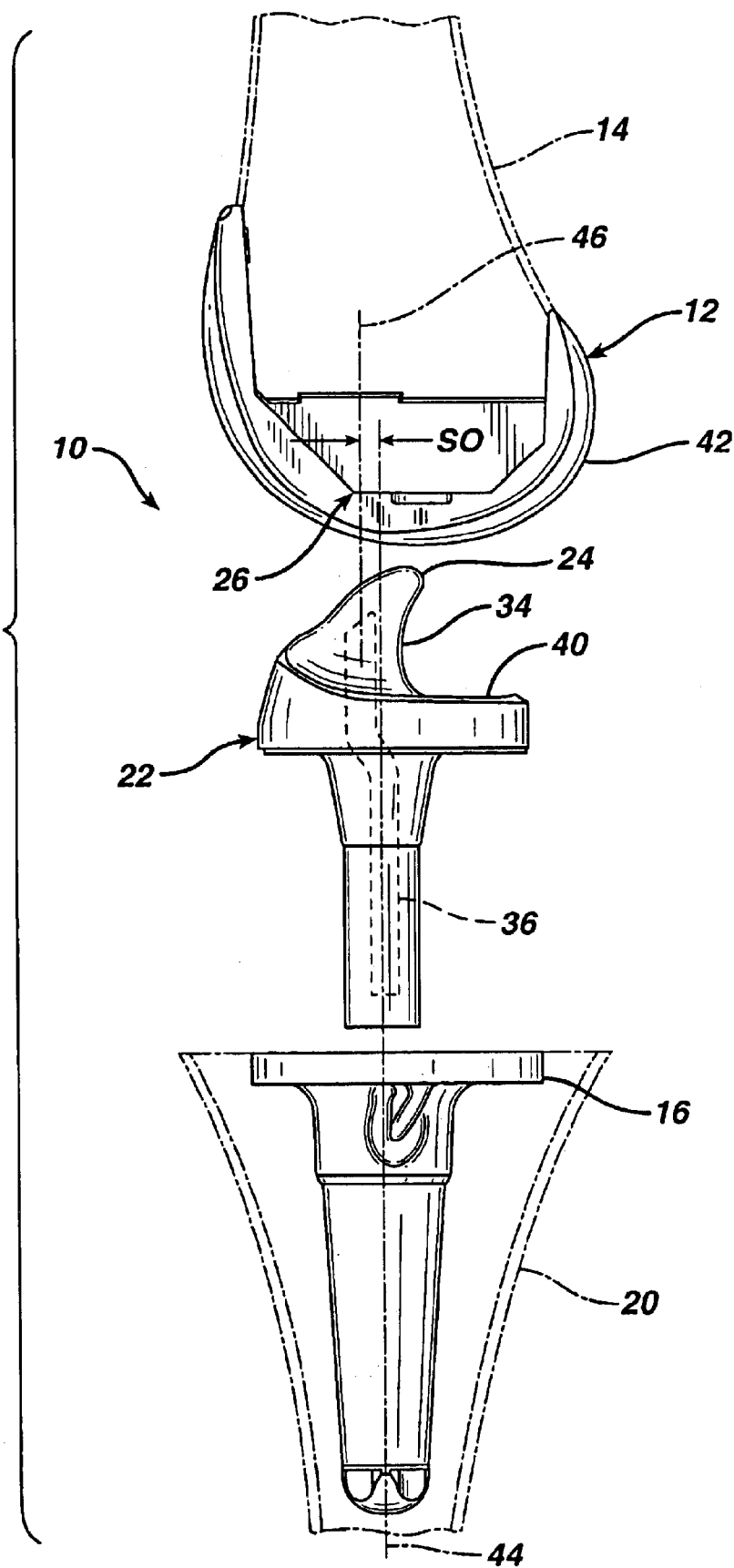
FIG. 8 is a fully exploded side view showing the plastic bearing component removed from the tibial.
Figure 9:
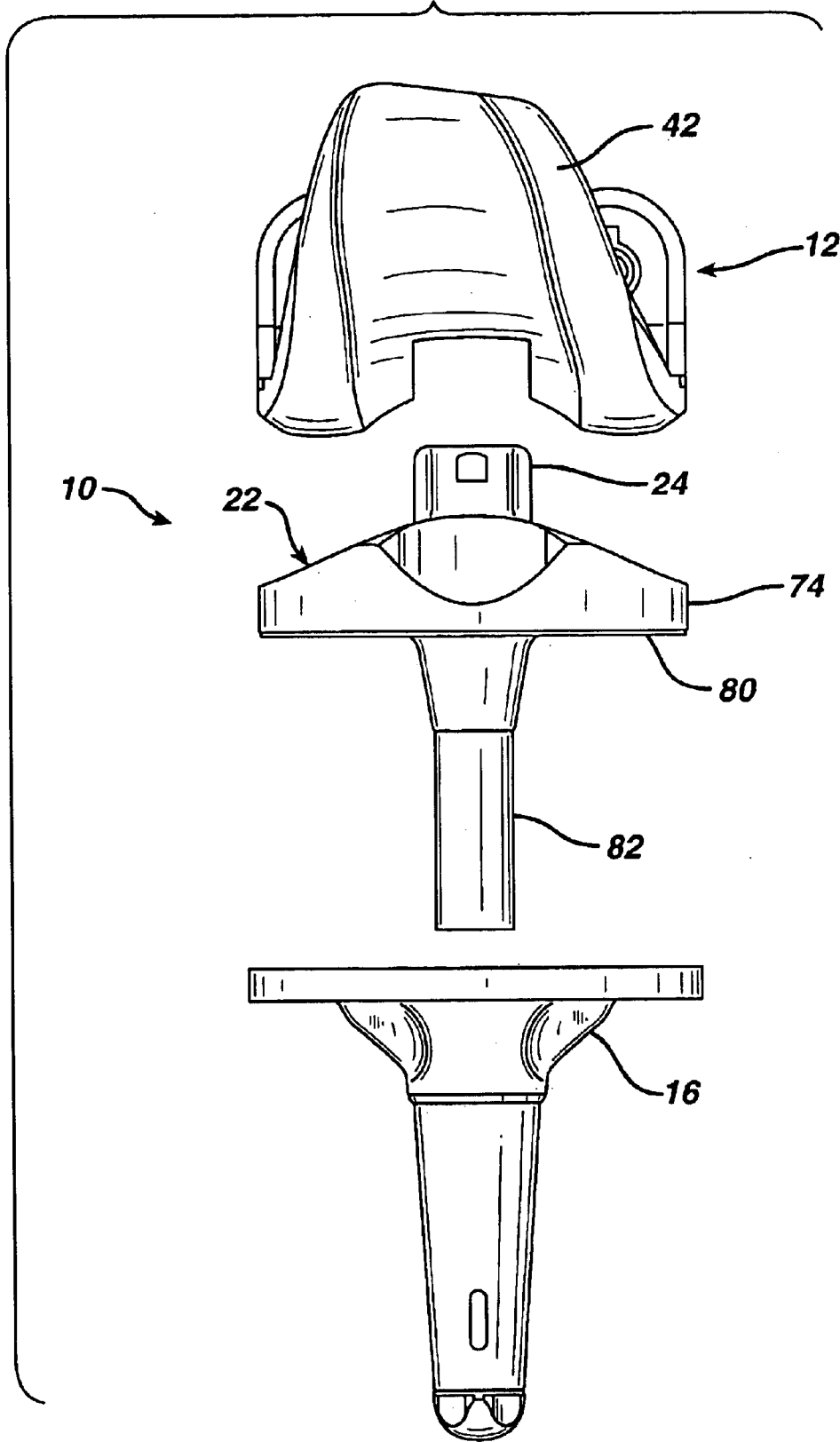
FIG. 9 is a fully exploded elevation view from the anterior showing the plastic bearing component removed from the tibial

Referring now to FIG. 8, a joint prosthesis in the form of knee prosthesis 10 for use in the mold and with the process of the present invention as shown. The knee prosthesis 10 includes a femoral component or first joint component 12 for attachment to femur or first long bone 14. The prosthesis 10 further includes a tibial tray or second joint component 16 for attachment to tibia or second long bone 20. The femoral component 12 and the tibial component 16 are shown in greater detail in FIGS. 1–9 and 16–19. The femoral component 12 and the tibial component 16 are made of any suitable durable material, which is biocompatible with the human body. The femoral component 12 and the tibial component 16 may, for example, be made of a metal alloy, for example, cobalt-chromium-molybdenum, a titanium alloy, or be made of stainless steel.

The knee prosthesis 10 further includes a bearing component 22. The bearing component 22 is positionable between the femoral component 12 and the tibial tray 16. The bearing component 22 cooperates with the femoral component 12 and the tibial tray 16 to provide for the desired kinematics of the knee prosthesis.

The prosthesis as shown in FIGS. 1–9 and 16–19 are commonly referred to as a mobile bearing prosthesis or a mobile bearing knee. Such mobile bearing knees have been provided by DePuy Orthopaedics, Inc. under the trade name LCS since about 1977. Mobile bearing knees of this type are different than fixed bearing knees in that the tibial tray 16 and the bearing component 22 may be physically separated from each other. The use of mobile bearing knees may require that the patient have satisfactory cruciate ligaments and tendons necessary to maintain the proper relationship of the femoral component to the bearing component. In those cases where the cruciate ligaments are either severely damaged or have been sacrificed or removed during a knee surgery, provisions must be made within the prosthesis to constrain the femoral component with respect to the tibial tray to prevent subluxation or dislocation.

Figure 16:
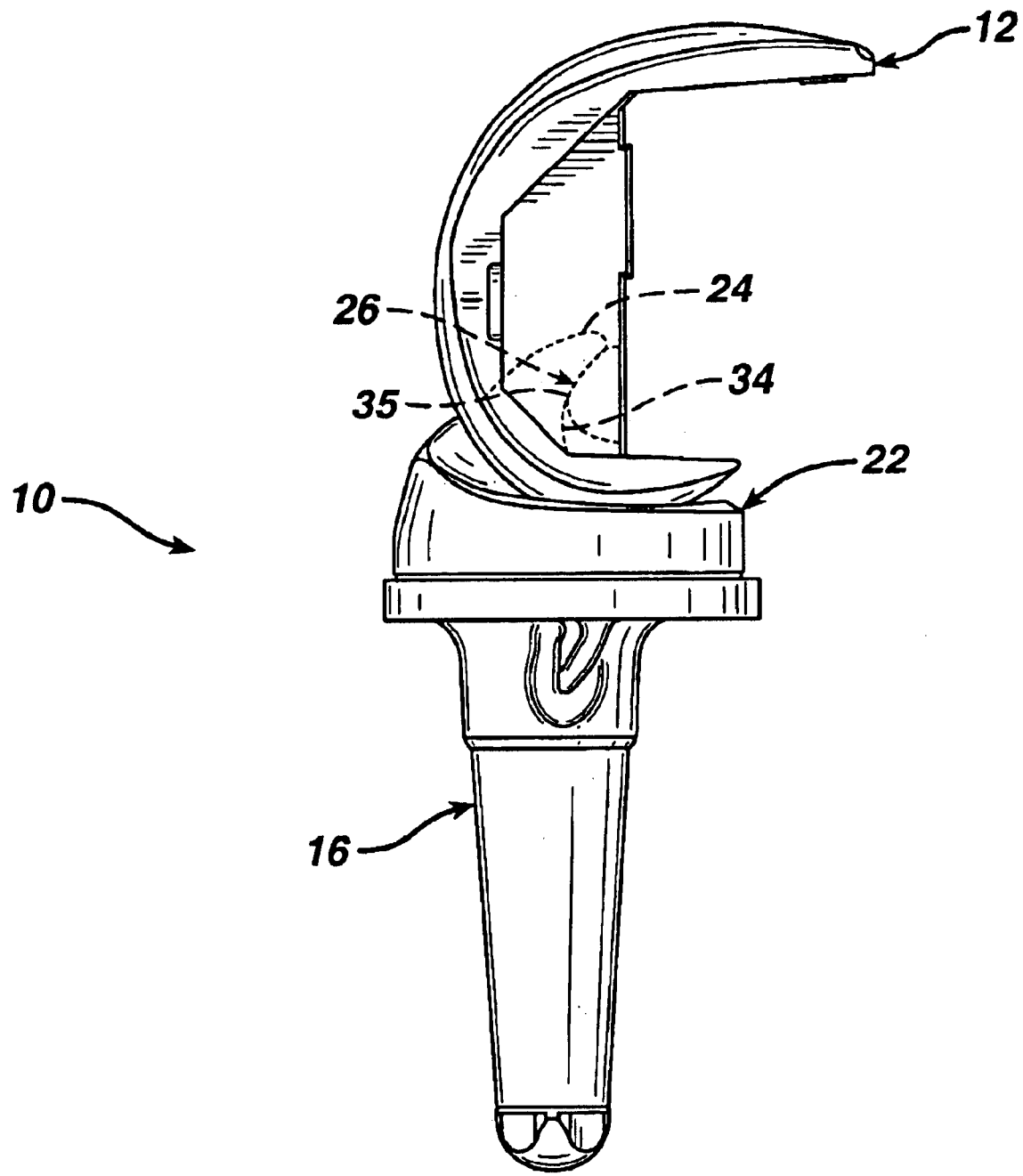
FIG. 16 is a side view of the assembly shown in FIGS. 1 and 2 showing the assembly in flexion.
Figure 17:
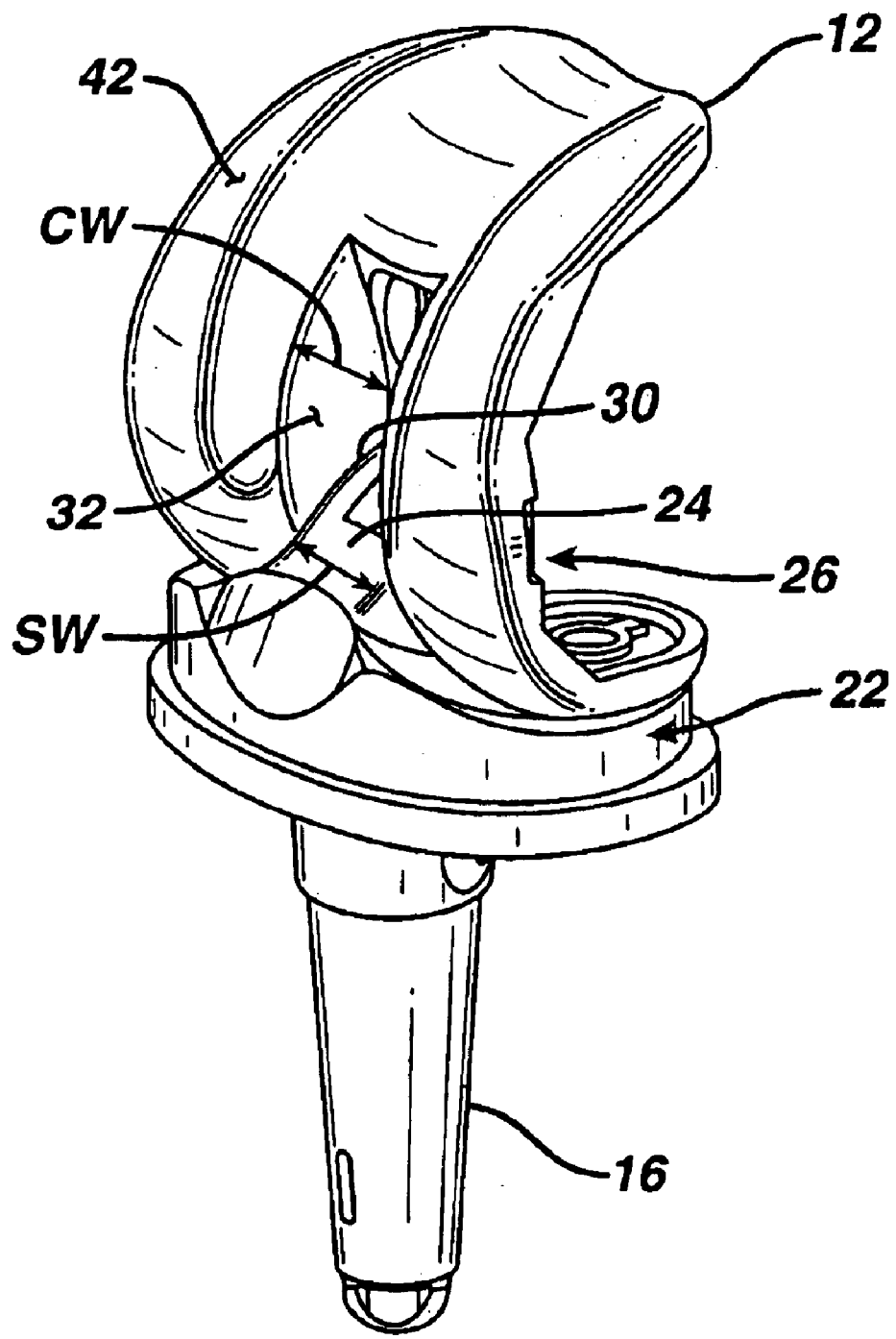
FIG. 17 is a perspective view of the knee system of FIG. 1 including the bearing component of the present invention showing the femoral component and the tibial component with the tibial bearing showing the knee system in flexion.
Figure 18:
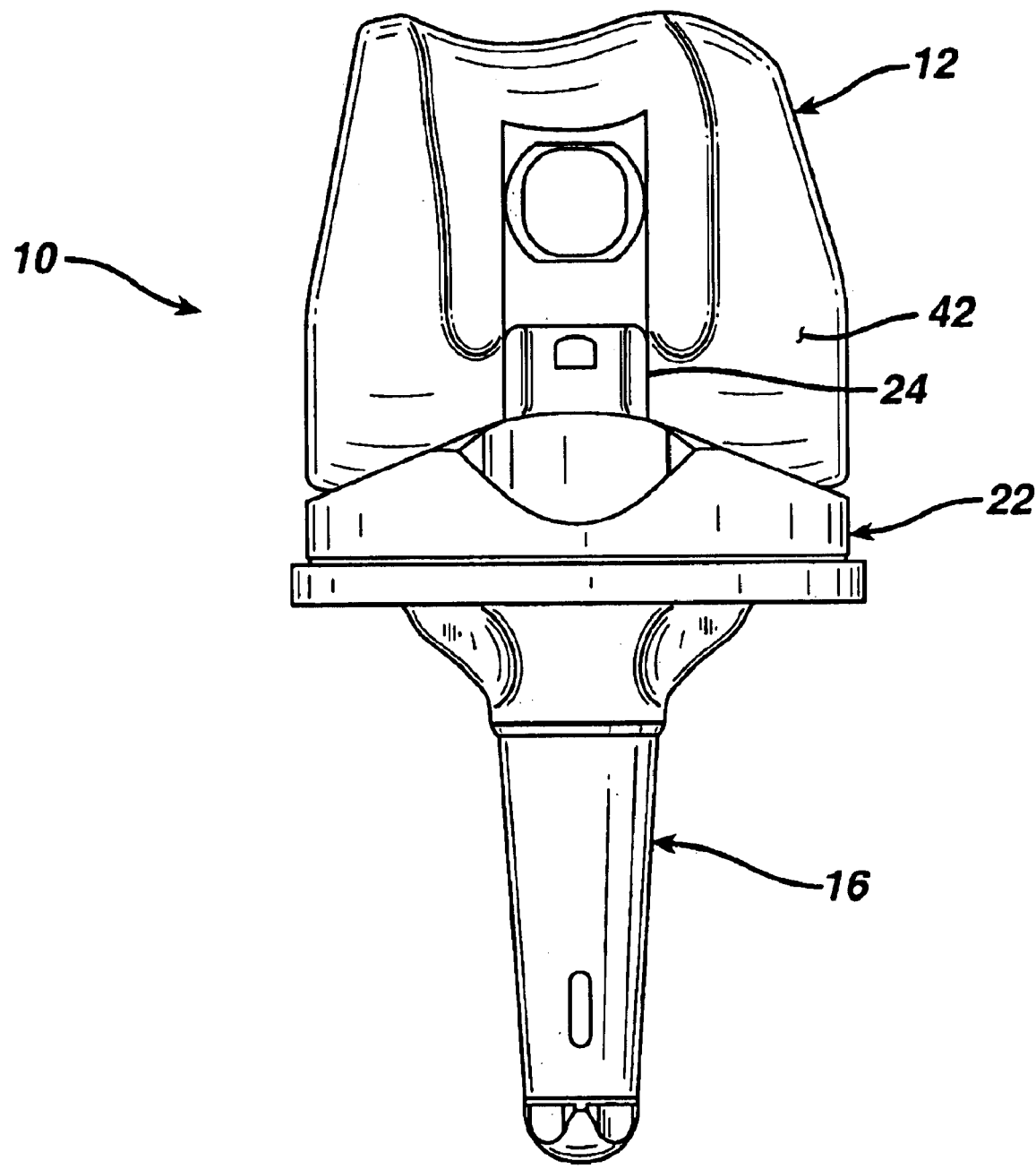
FIG. 18 is an elevation view from the anterior side of the assembly shown in FIGS. 1 and 2 showing the assembly in flexion.
Figure 19:
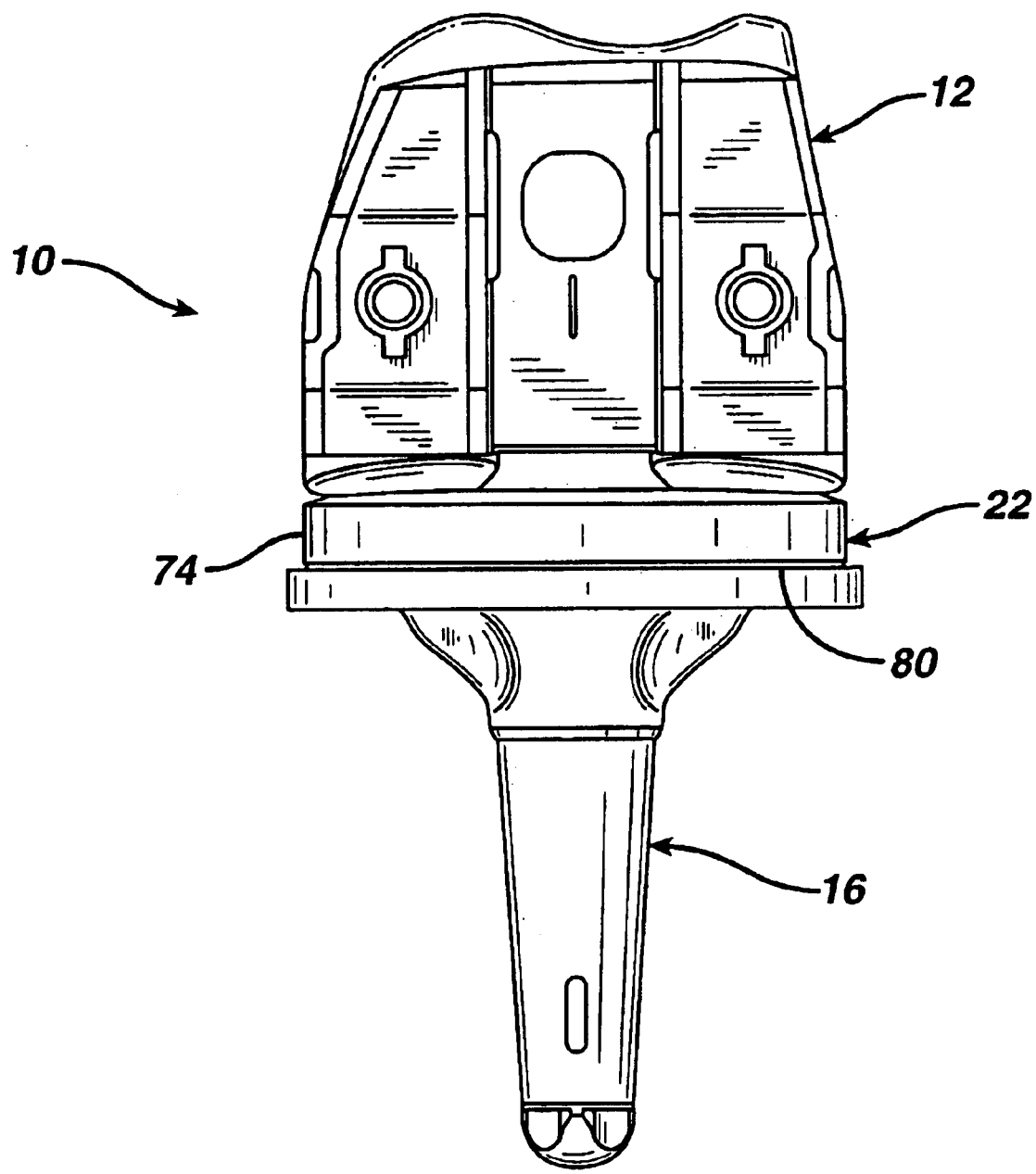
FIG. 19 is an elevation view from the posterior side of the assembly shown in FIGS. 1 and 2 showing the assembly in flexion.

Referring now to FIGS. 16 and 17, one solution to restraining the femoral component 12 with respect to the tibial tray 16 is by the use of a mechanism in the form of a spine 24 located on the bearing component 22 which mates with cam 26 located on femoral component 12. As shown in FIGS. 16 and 17, to provide medial/lateral support for the knee prosthesis 10 preferably the femoral component 12 includes femoral face 30 which cooperate with spine faces 32 on the spine 24. The spine faces 32 define a spine width SW which is related to the femoral width CW defined by femoral faces 30 to allow for the desired kinematics in the medial—lateral direction.

Referring now to FIG. 8, to provide anterior support the spine 24 includes a cam cooperating face or first surface 34 with which the spine cooperating face 35 of the cam 26 cooperates (see FIG. 16). It should be appreciated that for patients in which the posterior cruciate is severely damaged, compromised or missing, or when the stabilizing soft tissue has been compromised, the forces on the spine 24 both anterior/posterior and medial/lateral can be quite severe.

Preferably, and as shown in FIG. 8, the bearing component 22 is made of a polymeric material, for example, polyethylene. Preferably, the bearing component 22 is made of UHMWPE.

The bearing component 22 may be further processed to improve the wear properties of contact surface 40 of the bearing component. The contact surface 40 is that surface that is in contact with outer periphery 42 of the femoral component 12. Methods of improving the wear properties of UHMWPE include a process known as Gamma Vacuum Foil (GVF), as disclosed in U.S. Pat. No. 5,577,368 to Hamilton, et al, and a process known as the Marathon® process, as disclosed in U.S. Pat. No. 6,017,975 and U.S. Pat. No. 6,242,507 to Saum, et al and in U.S. Pat. No. 6,228,900 to McKellop, et al.

Referring again to FIG. 8 and according to the present invention, the bearing component 22 of the prosthesis 10 includes a first component or reinforcing component 36. The first component 36 serves to strengthen or support the bearing component 22 so that the spine 24 may withstand the forces that are present in the spine of the knee prosthesis 10 when the cruciate ligaments and collateral ligaments and stabilizing soft tissue cannot support the knee properly.

Since the bearing component 22 is preferably made of a polymer, and since the first component 36 is to strengthen the bearing component 22, the first component 36 is preferably made of a higher strength material than the polymer, preferably a material with a higher modulus of elasticity. For example, the first component 36 may be made of a metal that is a material compatible with the human anatomy, such as, stainless steel, a titanium and the alloys or a cobalt-chromium-molybdenum alloy.

Applicants have found that desired kinematics of the knee during a full range of motion may require that an optimum design of the components that comprise a knee prosthesis, for example those of FIG. 8, may include an tibial tray 16 having a central pivot axis 44 which is not coincident with center line 46 of the spine 24 of the bearing component 22.

Referring now to FIG. 10, the bearing component 22 of the prosthesis 10 includes the first component 36 which is designed to accommodate the fact that centerline 44 of the central pivot stem of the tibial tray 16 is offset from centerline 46 of the spine 24 (see FIG. 8). Thus, as shown in FIG. 10, the first component 36 is designed with a first centerline 50, which is not coincident with second centerline 52. As shown in FIGS. 8 and 10, the first centerline 50 of the first component 36 is coincident with central pivot stem centerline 44 of tibial tray 16. Similarly, the second centerline 52 of the first component 36 is coincident with the centerline 46 of the spine 24.

Continuing to refer to FIG. 10, the first component 36 includes a first portion 54, which defines the first centerline 50 thereof. The first component 36 further includes a second portion 56 thereof, which defines the second centerline 52 thereof. The first centerline 50 and the second centerline 52 are non-coincidental.

As shown in FIG. 10, the first centerline 50 may be parallel and spaced from the second centerline 52. It should be appreciated, however, that the first centerline 50 and the second centerline 52 may, in fact, be skewed or converging or diverging. As shown, in FIG. 10, however, the first centerline 50 and the second centerline 52 are separated and offset a distance CO which is related to the offset SO between the centerline of 46 of spine 24 and the centerline 44 of the tibial tray 16 (see FIG. 8).

As shown in FIG. 10, the first component 36 includes a connecting portion 60 positioned between first portion 54 and second portion 56. The connecting portion 60 may have any suitable shape, but preferably for strength and simplicity, the connecting portion 60 is an arcuate portion. In such a configuration, the shape of the connecting portion 60 is defined by a pair of radii, R1 and R2, which may, for example, be similar.

While it should be appreciated that the first component 36 may have any suitable shape capable of providing for support with a pair of offset centerlines, it should be appreciated that for simplicity, and as shown in FIG. 10A, the first component 36 may have a uniform cross section. For example, the cross section of the first component may be square, triangular, hexagonal or as shown in FIG. 10A may be circular. A circular cross section may provide for optimum bending strength in a variety of directions for a given weight or size of the first component 36.

The first component 36 may be hollow or as shown in FIG. 10 may be made of a generally solid material. Due to space constraints the first component 36 may be solid as shown in FIG. 10.

As can be readily apparent by the FIGS. 10 and 8, in particular, the bearing component 22 including the first component 36, may be made by a number of methods but cannot simply and easily be made by first making the bearing component 22 and then preparing an opening or conduit for installing the first component 36 therein. Therefore, typical methods of providing a reinforcing rod to a bearing component 22 in the form of drilling a hole in the bearing component 22 and inserting a straight cylindrical rod therein is not possible.

Figure 11:
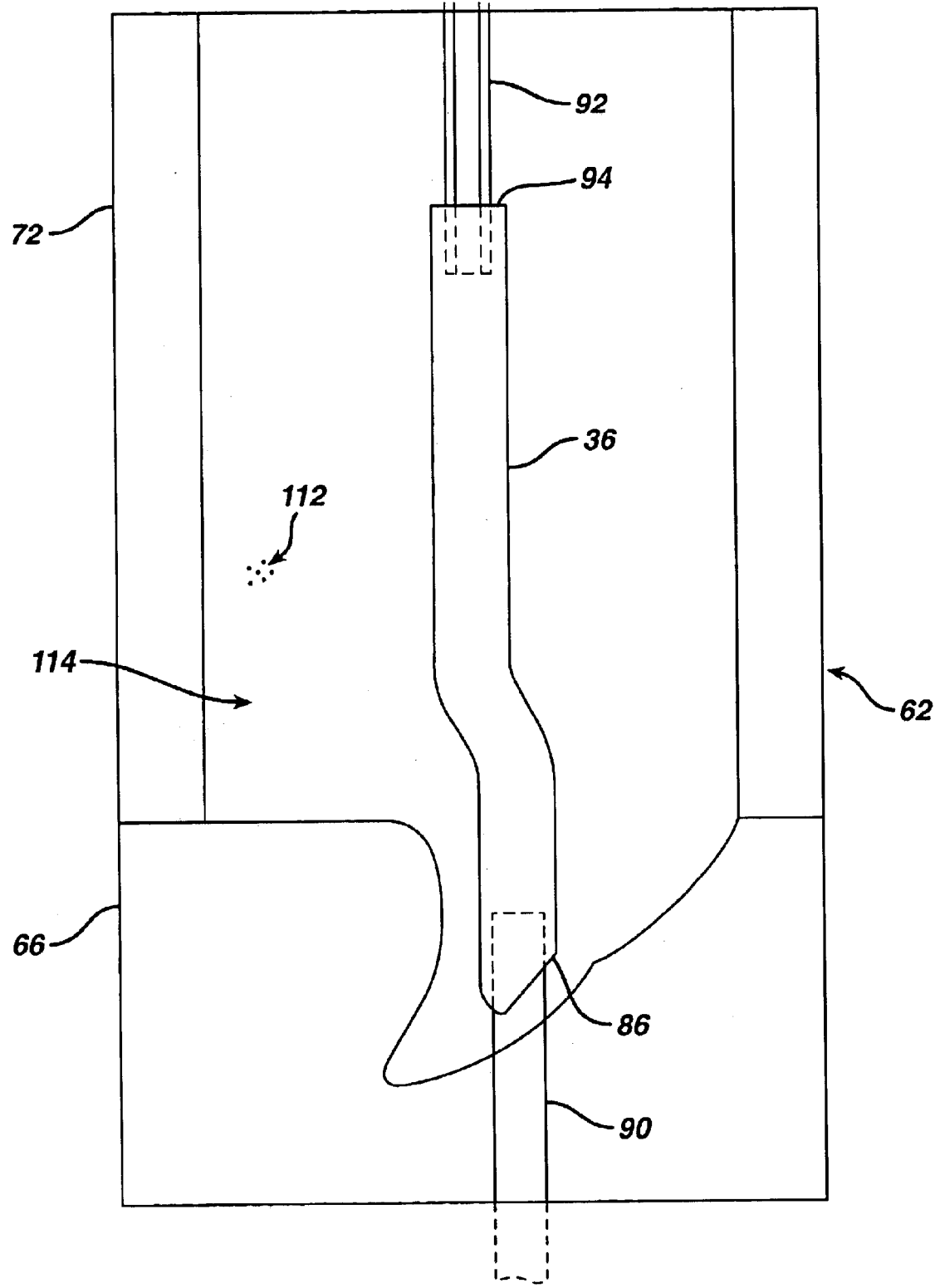
FIG. 11 is a plan view of the reinforcing rod of FIG. 10 located in a molding die for use in manufacturing the bearing component for the prosthesis of the present invention.
Figure 12:
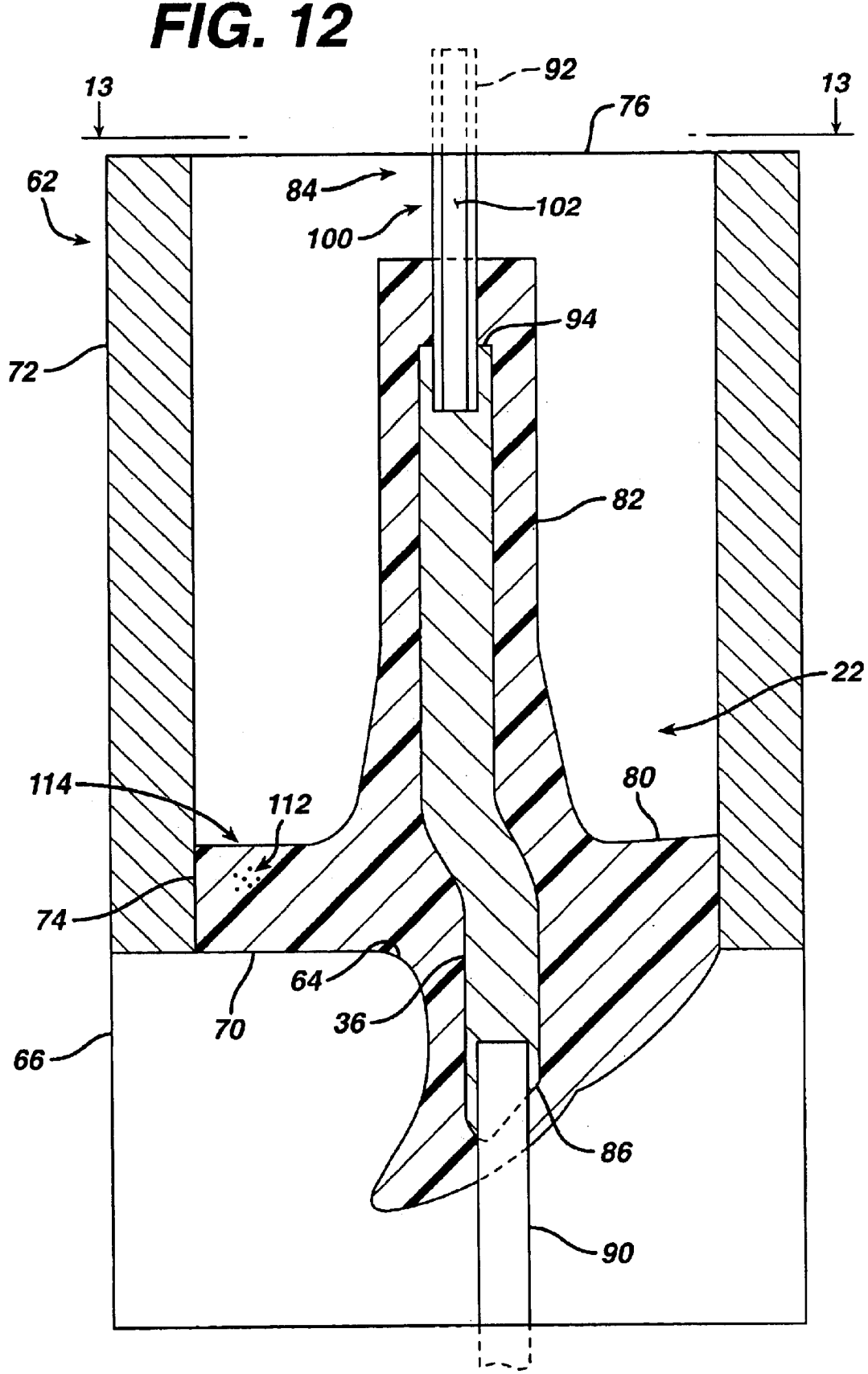
FIG. 12 is a plan view of the reinforcing rod of FIG. 10 located in a molding die shown partially in cross section for use in manufacturing the bearing component for the prosthesis of the present invention showing the molding die in greater detail.
Figure 13:
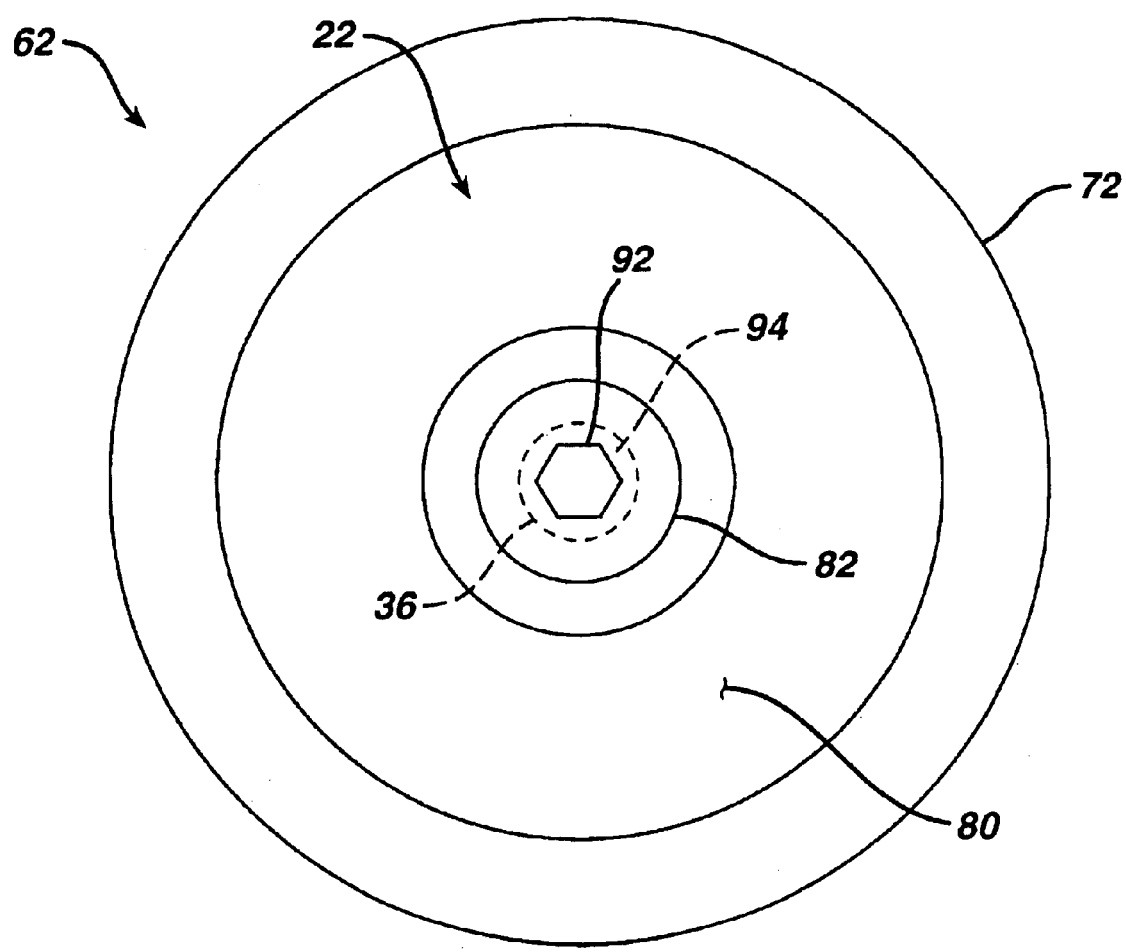
FIG. 13 is a bottom view of the molding die of FIG. 12.

Therefore, according to the present invention and referring to FIGS. 11, 12 and 13, the bearing component 22 is preferably made by a molding process, for example, a compression molding process or any molding process by which the polymeric material may be processed. It should be appreciated, however, that the first component 36 may be made by other methods. For example, the bearing component 22 may be made by adding the polymeric material to the first component 36 by applying the material onto the first component or other methods of applying the polymeric material.

Referring to FIGS. 11, 12 and 13, and according to the present invention, the bearing component 22 is preferably made in molding die 62. While the bearing component 22 may be manufactured utilizing any suitable molding technique, preferably, and as shown in FIG. 12, the molding die 62 is for use with direct compression molding. Compression molding consists of consolidating a plastic powder in a mold cavity. Plastic powder is placed into the molding die 62, the die is closed and pressure is applied to compress, heat, and cause flow of the plastic to be conformed to the cavity shape.

The molding die 62 is made in a shape including an inner forming surface 64 which is made in the shape of the final finished bearing component 22. Preferably, the inner forming surface 64 is sized to allow for appropriate shrinking dimensions as is known in the art.

The molding die is made in several pieces. Typically, a base or bottom mold or a first mold portion 66 is utilized to form articular surface or first surface 70 and cam cooperating face 34, of the bearing component 22. The cam cooperating face 34 is formed by first forming surface of base mold 66. The molding die 62 also includes a body or side mold 72. The body 72 is utilized to form the curved profile 74 of the bearing component 22. Also, the molding die 62 further includes a plunger assembly or second mold portion 76. The plunger assembly 76 is utilized to form bottom bearing surface or second surface 80 and the rotating shaft 82. The rotating shaft 82 is formed by second forming surface of plunger assembly 76. One mold may be used to obtain varying thicknesses of the bearing component 22.

In order to manufacture the bearing component 22 according to the present invention, the molding die 62 is modified to support first component 36 in the form of, for example, a reinforcing rod.

Preferably, and as shown in FIG. 12, reinforcing rod 36 is position spaced from the inner forming surface 64. Preferably, and as shown in FIG. 12, the reinforcing rod 36 is kept spaced from the inner forming surface 64 by use of an orientation feature 84. The orientation feature 84 is utilized to space or position the reinforcing rod 36 within the molding die 62. As initially designed to provide the offset between the spine and distal stem of bearing component 22. The positioner or support system 84 may support or secure the first component of 36 at any suitable position on the first component 36. For simplicity, and as shown in FIG. 12, the positioner 84 may be located on first end 86 of the reinforcing rod 36.

The positioner 84 may include a sole positioning member, which interacts with first end 86 of the reinforcing rod 36. If the positioner is located only on one end and the rod is held at that one end, that portion of the die including the positioner either at the base or bottom mold 66 or the plunger or top mold 76 must provide rigid temporary attachment of the reinforcing rod 36 to the positioner 84. While the present invention may be practiced utilizing a sole positioner located on one end of the reinforcing rod 36, such a configuration may have some problems in that the tolerance between the positioner and the reinforcing rod may be such that the accuracy of the position of the reinforcing rod 36 within the molding die 62 may not be sufficiently accurate resulting in the misposition of the reinforcing rod 36 within the finished first component 36. Misposition may occur either in the anterior-posterior or medial-lateral direction. Additionally, the reinforcing pin 36 may be rotationally mispositioned with respect to the superior spine and distal stem.

Preferably, thus, and as shown in FIG. 12, the positioner 84 is in the form of a first positioner 90 located at the first end 86 of the reinforcing rod 36 and a second positioner 92 located at second end 94 of the reinforcing rod 36. If the reinforcing rod 36 is held at both the first end 86 and the second end 94 of the rod 36, then one end, for example, first end 86 must be a sliding temporary attachment and the other end, for example, second end 94 or second positioner 92 must be a rigid temporary attachment. A sliding temporary attachment is necessary as the two ends of the molding die approach and separate from each other during each molding cycle. Additionally, the sliding temporary attachment provides for rotational alignment to obtain the optional position of the reinforcing rod 36 in the spine by allowing approximately equal polymeric material around the reinforcing rod 36.

To improve the accuracy of the positioning of the reinforcing rod 36 within the molding die 62, optionally, the molding die may include an orientation feature 100 to optimally angularly orient the reinforcing rod 36 with respect to the inner forming surface 64 and eventually the first component 36. The orientation feature 100 may, for example, be included with the positioners 90 and 92 and may, as shown in FIG. 12, be in the form of flat 102 located on the second positioner 92. As shown in FIG. 12, the orientation feature 100 is in the form of six equally spaced flats, three of which are shown. Therefore, the positioner 84 and the orientation features are in the form of a hexagonal rod. An additional flat may help fine-tuning of the position within the mold.

Referring again to FIG. 10, preferably, the reinforcing rod 36 includes positioning features in the form of, for example, first recess 104, which is located on first end 86 of the rod 36, and second recess 106, which is located on second end 94 of the rod 36. The first recess 104 matingly receives the first positioner 90 while the second recess 106 receives the second positioner 92 (see FIG. 11). Preferably, and as shown in FIG. 10, the second recess 106 includes a recess flat 110 which mate with flat 102 on second positioner 92.

Referring again to FIG. 12, plastic powder 112 is added in the proper amount into cavity 114 of the molding die 62. The molding die 62 is closed by the positioning of the plunger assembly or top mold 76 over the body or side mold 72 of the molding die 62.

The bearing component 22 is fully formed by subjecting the molding die 62 to the well-known conditions of pressure and temperature and time required to consolidate the powder 112. After appropriate cooling, the molding die 62 is opened by the removal of the plunger assembly or top mold 76 from the body or side mold 72. The bearing component 22, including the reinforcing rod 36, is then removed from the cavity 114 of the molding die 62. After proper cleaning additional powder 112 and a new reinforcing rod 36 is added to the cavity 114 and the process is repeated in order to obtain a second component.

Figure 15:
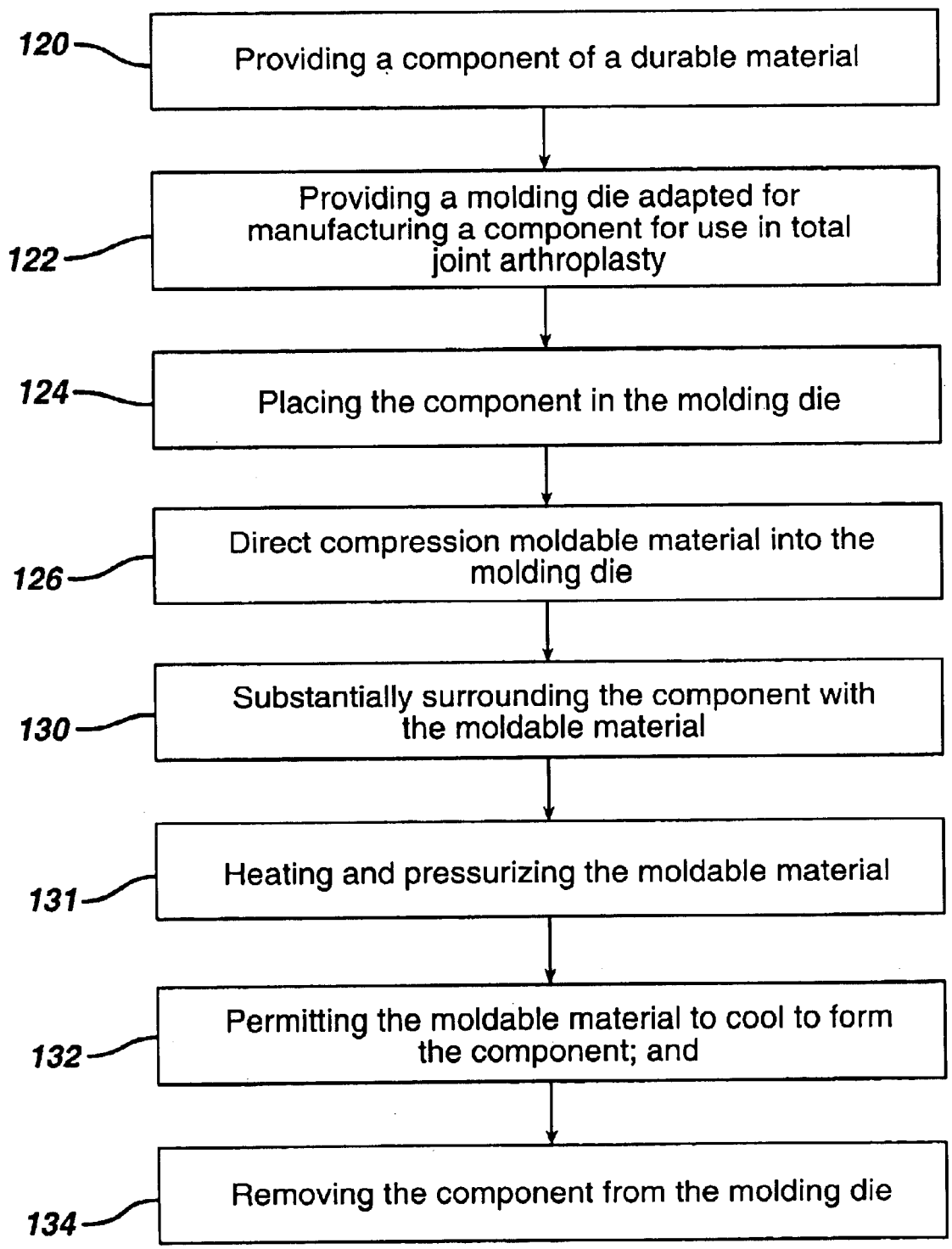
FIG. 15 is a process flow chart for a method of manufacturing the prosthesis component of FIG. 16.

Referring now to FIG. 15, and according to the present invention, a process for molding a bearing component with a reinforcing rod is described more fully. First step 120 of the process described in FIG. 15, is the step of providing a support of a durable material. The durable material may, for example, be in the form of cobalt-chrome alloy, stainless steel or titanium and its alloys. The support may be in the form of, for example, an elongated member, for example, a rod. The rod, as described in the present invention, is in the form of a bent rod or a rod having two substantially linear portions with the portions being skewed or non-linear with respect to each other.

Second step 122 of the process, as described in FIG. 15, is the step of providing a molding die adapted for manufacturing a component for use in total joint arthroplasty.

Third step 124 in the process is the step of placing the support into the molding die in the desired portion. Fourth step 126 of the process is adding moldable material into the molding die. Fifth step 130 in the process for making a component is the step of substantially surrounding the support with moldable powder material. Sixth step 131 of the process is the step of heating and pressurizing the mold, and thus the moldable material powder. Seventh step 132 of the process is the step of permitting the moldable material to cool to form the component and eighth step 134 of the process is the step of removing the component from the molding die.

Figure 14:
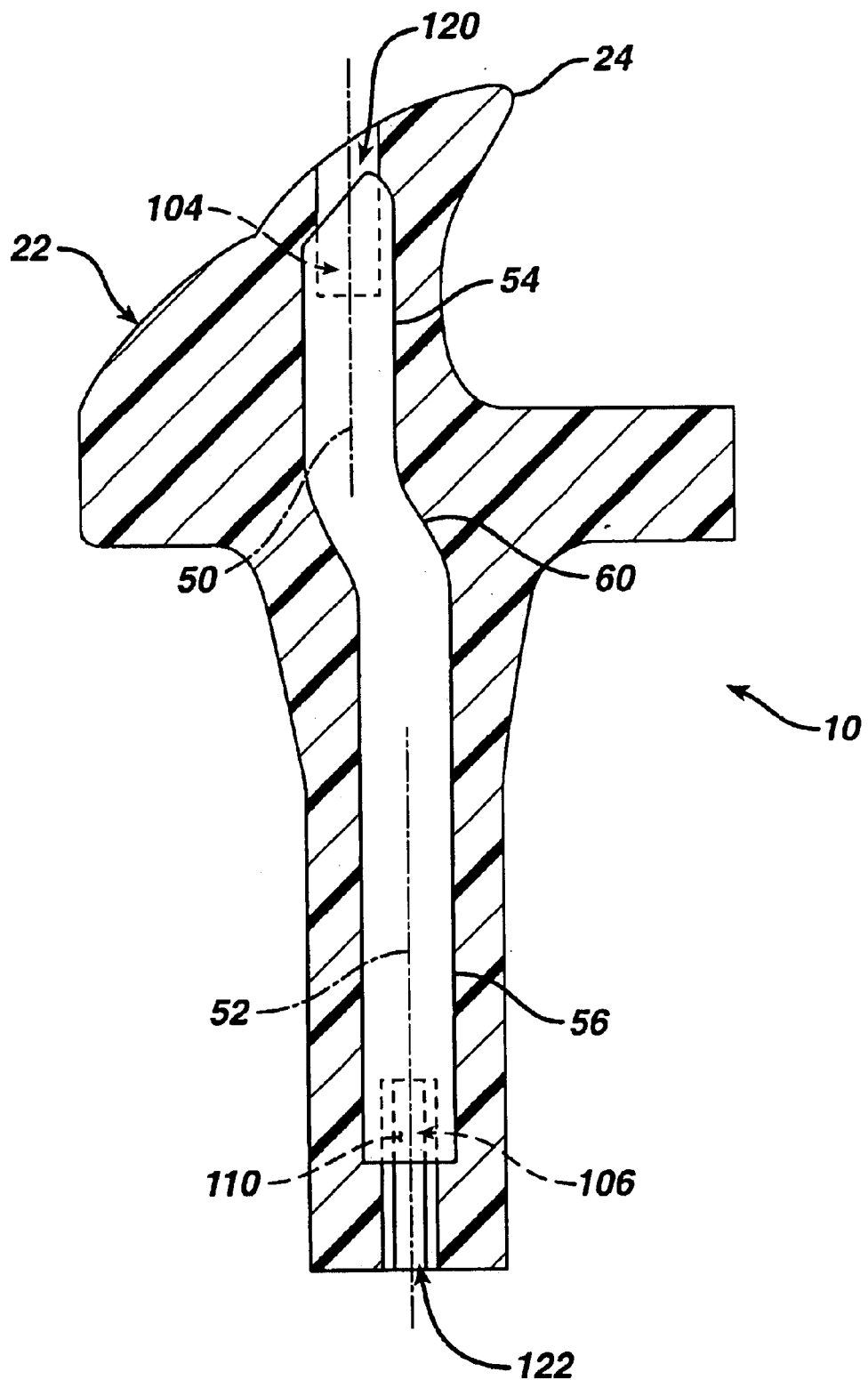
FIG. 14 is a plan view of the bearing component made from the reinforcing rod of FIG. 10 utilizing the molding die of FIG. 12.

Referring to FIG. 14, since the prosthesis 10 including the bearing component 22 will be implanted into the human body, it is essential that the prosthesis 10, including the bearing component 22, be sterilized. Several effective methods of sterilization are possible for the prosthesis 10, including the bearing component 22. For example, the bearing component 22 may be sterilized by subjecting the bearing component 22 to gamma irradiation. The subjection of the bearing component 22 to gamma irradiation may lead to the presence of free radicals within the polymer or polyethylene from which the bearing component 22 is typically manufactured. The presence of free radicals within the bearing component 22 may lead to early degradation through an oxidation process of the bearing component 22.

To minimize the negative effect of the free radicals generated from gamma sterilization, the bearing component 22 is preferably barrier packaged in vacuum or inert gas to keep the oxygen out and also to trap hydrogen gas generated by the sterilization process inside the package. Such treatment precludes or reduces oxidation of the bearing material and sufficient sterilization for the bearing component 22.

Referring now to FIG. 14, the bearing component 22 is shown having been molded in the molding die 62 (see FIGS. 12 & 13). In FIG. 12, in order that the first positioner 90 and the second positioner 92 may be removed from the cavity 114, and from the bearing component 22 when it is removed from the cavity 114 of the molding die 62, the bearing component 22 includes a first bearing component opening 120 located in line and above the first recess 104 of the reinforcing rod 36. Likewise, the bearing component 22 further includes a second bearing component opening 122 extending outwardly from the second recess 106 of the reinforcing rod 36. The first bearing component 120 and the second bearing component opening 122 provide for access to the reinforcing rod 36 from the outside of the bearing component 22.

By utilizing the non-linear re-inforcement component of the present invention, a knee may be provided with improved load carrying capacity in the anterior/posterior and medial/lateral directions for the spine and cam mechanism in situations in which the center line of the insert, which engages the tibial tray and the superior spine portion, which rotationally engage the cam of the femoral component, are not in the same plane. In such situations where these planes are different, the kinematics of the knee may be improved.

By providing a molding die with a positioner to hold the support rod in a spaced from the die surface condition, a tibial tray may be provided with a sufficiently strong spine to support the patient when in a locked knee, standing position.

By providing a non-linear re-inforcing component to the tibial bearing insert, the non-linear support rod may be properly positioned within the tibial bearing insert.

By providing a tibial bearing insert including a nonlinear support, including an orientation feature, the support rod may be adjusted with respect to the tibial bearing insert during the manufacturing of the tibial bearing insert to optimize the load transfer mechanism through the spine.

Although the present invention and its advantages have been described in detail, it should be understood that various changes, substitutions, and alterations can be made therein without departing from the spirit and scope of the present invention as defined by the appended claims.

What is claimed is:

1. A method of manufacturing a polymeric bearing component for use in joint arthroplasty and for cooperation with a first joint component and a second joint component, comprising the steps of:

providing a non-linear reinforcing support of a durable material and having a first end and a second end thereof;

providing a molding die adapted for manufacturing the bearing component for use in total joint arthroplasty and having a first mold portion and a second mold portion thereof, the first mold portion adapted to provide a first surface of the bearing component for cooperation with the first joint component and the second mold portion adapted to provide a second surface of the bearing component for cooperation with the second joint component;

positioning the support in a desired position within the molding die, with one of the first end and at the second end located in the first mold portion;

adding moldable polymeric material into the molding die;

substantially surrounding the support with the moldable material;

heating and pressurizing the mold;

permitting the moldable material to cool to form the bearing component; and removing the component from the molding die, wherein the surrounding step comprises surrounding the support with the moldable material extending normally from the surface of said support a distance of at least 5 millimeters.

2. A method of manufacturing a polymeric bearing component for use in joint arthroplasty and for cooperation with a first joint component and a second joint component, comprising the steps of:

providing a non-linear reinforcing support of a durable material and having a first end and a second end thereof;

providing a molding die adapted for manufacturing the bearing component for use in total joint arthroplasty and having a first mold portion and a second mold portion thereof, the first mold portion adapted to provide a first surface of the bearing component for cooperation with the first joint component and the second mold portion adapted to provide a second surface of the bearing component for cooperation with the second joint component; positioning positioning the support in a desired position within the molding die, with one of the first end and at the second end located in the first mold portion;

adding moldable polymeric material into the molding die;

substantially surrounding the support with the moldable material;

heating and pressurizing the mold;

permitting the moldable material to cool to form the bearing component; and removing the component from the molding die, further comprising the step of providing a support structure for supporting a support within the molding die after the step of providing a molding die, wherein the step of providing a support structure comprises providing a support structure made at least one of a metal and a polymer.

3. A method of manufacturing a polymeric bearing component for use in joint arthroplasty and for cooperation with a first joint component and a second joint component, comprising the steps of:

providing a non-linear reinforcing support of a durable material and having a first end and a second end thereof;

providing a molding die adapted for manufacturing the bearing component for use in total joint arthroplasty and having a first mold portion and a second mold portion thereof the first mold portion adapted to provide a first surface of the bearing component for cooperation with the first joint component and the second mold portion adapted to provide a second surface of the bearing component for cooperation with the second joint component;

positioning the support in a desired position within the molding die, with one of the first end and at the second end located in the first mold portion;

adding moldable polymeric material into the molding die;

substantially surrounding the support with the moldable material;

heating and pressurizing the mold;

permitting the moldable material to cool to form the bearing component; and removing the component from the molding die, further comprising the step of providing a support structure for supporting a support within the molding die after the step of providing a molding, further comprising the step of retracting the support structure one of concurrent with and after the step of permitting the moldable material to cool.

4. A method of manufacturing a polymeric bearing component for use in joint arthroplasty and for cooperation with a first joint component and a second joint component, comprising the steps of:

providing a non-linear reinforcing support of a durable material and having a first end and a second end thereof;

providing a molding die adapted for manufacturing the bearing component for use in total joint arthroplasty and having a first mold portion and a second mold portion thereof, the first mold portion adapted to provide a first surface of the bearing component for cooperation with the first joint component and the second mold portion adapted to provide a second surface of the bearing component for cooperation with the second joint component;

positioning the support in a desired position within the molding die, with one of the first end and at the second end located in the first mold portion;

adding moldable polymeric material into the molding die;

substantially surrounding the support with the moldable material;

heating and pressurizing the mold; permitting the moldable material to cool to form the bearing component; and removing the component from the molding die, further comprising the step of providing a support structure for supporting a support within the molding die after the step of providing a molding die, wherein the step of providing a support structure comprises providing a support in the form of a plurality of pins.

5. A method of manufacturing a polymeric bearing component for use in joint arthroplasty and for cooperation with a first joint component and a second joint component, comprising the steps of:

providing a non-linear reinforcing support of a durable material and having a first end and a second end thereof;

providing a molding die adapted for manufacturing the bearing component for use in total joint arthroplasty and having a first mold portion and a second mold portion thereof, the first mold portion adapted to provide a first surface of the bearing component for cooperation with the first joint component and the second mold portion adapted to provide a second surface of the bearing component for cooperation with the second joint component;

positioning the support in a desired position within the molding die, with one of the first end and at the second end located in the first mold portion;

adding moldable polymeric material into the molding die;

substantially surrounding the support with the moldable material;

heating and pressurizing the mold;

permitting the moldable material to cool to form the bearing component; and removing the component from the molding die, further comprising the step of providing a support structure for supporting a support within the molding die after the step of providing a molding, wherein the step of providing a support structure comprises providing at least one of providing a support in the form of a plurality of pins having at least one pin having an orientation feature cooperable with the molding die for adjusting the orientation of the component within the die.

6. A method of manufacturing a polymeric bearing component for use in joint arthroplasty and for cooperation with a first joint component and a second joint component, comprising the steps of:

providing a non-linear reinforcing support of a durable material and having a first end and a second end thereof;

providing a molding die adapted for manufacturing the bearing component for use in total joint arthroplasty and having a first mold portion and a second mold portion thereof, the first mold portion adapted to provide a first surface of the bearing component for cooperation with the first joint component and the second mold portion adapted to provide a second surface of the bearing component for cooperation with the second joint component;

positioning the support in a desired position within the molding die, with one of the first end and at the second end located in the first mold portion;

adding moldable polymeric material into the molding die;

substantially surrounding the support with the moldable material;

heating and pressurizing the mold;

permitting the moldable material to cool to form the bearing component; and removing the component from the molding die, wherein the providing a support step comprises the steps of providing the support having a first portion defining a first centerline thereof and providing the support having a second portion defining a second centerline thereof, the first centerline and the second centerline being non-coincidental.

7. The method of claim 6, wherein the providing a support step comprises the steps of:

providing the first portion and the second portion, wherein the second centerline is parallel and spaced from the first centerline.

8. A method of manufacturing a polymeric bearing component for use in joint arthroplasty and for cooperation with a first joint component and a second joint component, comprising the steps of:

providing a non-linear reinforcing support of a durable material and having a first end and a second end thereof;

providing a molding die adapted for manufacturing the bearing component for use in total joint arthroplasty and having a first mold portion and a second mold portion thereof, the first mold portion adapted to provide a first surface of the bearing component for cooperation with the first joint component and the second mold portion adapted to provide a second surface of the bearing component for cooperation with the second joint component;

positioning the support in a desired position within the molding die, with one of the first end and at the second end located in the first mold portion;

adding moldable polymeric material into the molding die;

substantially surrounding the support with the moldable material;

heating and pressurizing the mold;

permitting the moldable material to cool to form the bearing component; and removing the component from the molding die, further comprising the step of providing a support structure for supporting a support within the molding die after the step of providing a molding die, wherein the placing step further comprises the step of spacing the support from internal walls of the molding die.

* * * * *